United States Patent
Holm et al.

(10) Patent No.: US 8,244,625 B2
(45) Date of Patent: Aug. 14, 2012

(54) SYSTEM AND METHOD FOR VARYING ELECTRONIC SETTLEMENTS BETWEEN BUYERS AND SUPPLIERS WITH DYNAMIC DISCOUNT TERMS

(75) Inventors: Don Holm, Walnut Creek, CA (US); Duc Lam, San Jose, CA (US); Xuan (Sunny) McRae, Fremont, CA (US)

(73) Assignee: JPMorgan Chase Bank, N.A., Wilmington, DE (US)

( * ) Notice: Subject to any disclaimer, the term of this patent is extended or adjusted under 35 U.S.C. 154(b) by 0 days.

(21) Appl. No.: 13/162,185

(22) Filed: Jun. 16, 2011

(65) Prior Publication Data

US 2011/0251965 A1    Oct. 13, 2011

Related U.S. Application Data

(63) Continuation of application No. 12/754,575, filed on Apr. 5, 2010, now Pat. No. 8,108,296, which is a continuation of application No. 10/155,806, filed on May 24, 2002, now abandoned.

(51) Int. Cl.
*G06Q 40/00* (2012.01)
(52) U.S. Cl. .......... 705/37; 705/35; 705/36; 705/26
(58) Field of Classification Search .......... 705/42, 705/29, 37, 40, 36 R, 317, 39
See application file for complete search history.

(56) References Cited

U.S. PATENT DOCUMENTS

| | | | |
|---|---|---|---|
| 3,653,480 A | 4/1972 | Yamamoto et al. | |
| 4,205,780 A | 6/1980 | Burns | |
| 4,264,808 A | 4/1981 | Owens et al. | |
| 4,321,672 A | 3/1982 | Braun et al. | |
| 4,385,285 A | 5/1983 | Horst et al. | |
| 4,396,985 A | 8/1983 | Ohara | |
| 4,495,018 A | 1/1985 | Vohrer | |
| 4,617,457 A | 10/1986 | Myers et al. | |
| 4,672,377 A | 6/1987 | Murphy | |
| 4,700,055 A | 10/1987 | Kashkashian, Jr. | |
| 4,752,877 A | 6/1988 | Roberts et al. | |
| 4,797,913 A | 1/1989 | Kaplan | |
| 4,799,156 A | 1/1989 | Shavit | |

(Continued)

FOREIGN PATENT DOCUMENTS

EP    421808    4/1991

(Continued)

OTHER PUBLICATIONS

Platt, Gordon; "Online Billing & Payments: Technology Providers Multiply"; Apr. 2001, Global Finance, vol. 15, No. 4, pp. 40-42.

(Continued)

*Primary Examiner* — Samica L Norman
(74) *Attorney, Agent, or Firm* — Hunton & Williams LLP

(57) ABSTRACT

A method of making payment. A request is received to effect payment between a buyer and a seller for a transaction having established terms. The terms include a payment amount and a settlement date. Messages are exchanged between the buyer and the seller that include an offer and acceptance of new terms for payment at other than the established terms. The new terms include an adjusted amount of payment to be made at a particular time after an event associated with the transaction. An electronic notification that the event has occurred is received, and the after the notification, payment between the buyer and seller is effected under the new terms.

14 Claims, 10 Drawing Sheets

U.S. PATENT DOCUMENTS

| | | |
|---|---|---|
| 4,812,628 A | 3/1989 | Boston |
| 4,823,264 A | 4/1989 | Deming |
| 4,931,793 A | 6/1990 | Fuhrmann et al. |
| 4,948,174 A | 8/1990 | Thomson et al. |
| 4,974,878 A | 12/1990 | Josephson |
| 4,988,849 A | 1/1991 | Sasaki |
| 4,992,646 A | 2/1991 | Collin |
| 5,023,904 A | 6/1991 | Kaplan |
| 5,053,607 A | 10/1991 | Carlson |
| 5,054,096 A | 10/1991 | Seizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee et al. |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,225,978 A | 7/1993 | Peterson |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe et al. |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn et al. |
| 5,373,550 A | 12/1994 | Campbell |
| 5,383,113 A | 1/1995 | Kight et al. |
| 5,396,417 A | 3/1995 | Burks |
| 5,402,474 A | 3/1995 | Miller |
| 5,412,190 A | 5/1995 | Kopesec et al. |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,487,100 A | 1/1996 | Kane |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | LeRoux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,689,593 A | 11/1997 | Pan et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,868 A | 2/1998 | James |
| 5,717,989 A | 2/1998 | Tozzoli et al. |
| 5,724,424 A | 3/1998 | Gifford |
| 5,727,249 A | 3/1998 | Pollin |
| 5,748,780 A | 5/1998 | Stolfo |
| 5,751,842 A | 5/1998 | Eccles et al. |
| 5,757,917 A | 5/1998 | Rose et al. |
| 5,770,843 A | 6/1998 | Rose et al. |
| 5,774,553 A | 6/1998 | Rosen |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,238 A | 10/1998 | Fernholz |
| 5,826,241 A | 10/1998 | Stein |
| 5,826,245 A | 10/1998 | Sandbe |
| 5,832,447 A | 11/1998 | Rieker |
| 5,832,460 A | 11/1998 | Bednar |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,848,400 A | 12/1998 | Chang |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Selinger et al. |
| 5,873,072 A | 2/1999 | Kight |
| 5,884,288 A | 3/1999 | Chang |
| 5,893,080 A | 4/1999 | McGurl et al. |
| 5,897,625 A | 4/1999 | Gustin |
| 5,898,157 A | 4/1999 | Mangili et al. |
| 5,903,881 A | 5/1999 | Schrader |
| 5,910,896 A | 6/1999 | Hahn-Carlson |
| 5,910,988 A | 6/1999 | Ballard |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |

| Patent Number | Date | Inventor(s) |
|---|---|---|
| 6,016,484 A | 1/2000 | Williams et al. |
| 6,021,202 A | 2/2000 | Anderson et al. |
| 6,026,388 A | 2/2000 | Liddy et al. |
| 6,029,139 A | 2/2000 | Cunningham et al. |
| 6,032,133 A | 2/2000 | Hilt et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,223,168 B1 | 4/2001 | McGurl et al. |
| 6,227,447 B1 | 5/2001 | Campisano |
| 6,233,566 B1 | 5/2001 | Levine et al. |
| 6,236,972 B1 | 5/2001 | Shkedy |
| 6,240,444 B1 | 5/2001 | Fin et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,298,335 B1 | 10/2001 | Bernstein |
| 6,301,379 B1 | 10/2001 | Thompson et al. |
| 6,304,858 B1 | 10/2001 | Mosier et al. |
| 6,321,212 B1 | 11/2001 | Lange |
| 6,324,524 B1 | 11/2001 | Lent et al. |
| 6,338,047 B1 | 1/2002 | Wallman |
| 6,338,049 B1 | 1/2002 | Walker et al. |
| 6,343,279 B1 | 1/2002 | Bissonette et al. |
| 6,347,307 B1 * | 2/2002 | Sandhu et al. ............... 705/36 R |
| 6,374,235 B1 | 4/2002 | Chen et al. |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,446,072 B1 | 9/2002 | Schulze et al. |
| 6,490,568 B1 | 12/2002 | Omara et al. |
| 6,493,685 B1 | 12/2002 | Ensel et al. |
| 6,535,896 B2 | 3/2003 | Britton et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,704,714 B1 | 3/2004 | O'Leary et al. |
| 6,721,715 B2 | 4/2004 | Nemzow |
| 6,825,940 B1 | 11/2004 | Wu et al. |
| 6,952,682 B1 | 10/2005 | Wellman |
| 6,954,896 B1 | 10/2005 | Dodrill et al. |
| 6,970,259 B1 | 11/2005 | Lunt et al. |
| 7,062,456 B1 | 6/2006 | Riehl et al. |
| 7,104,443 B1 | 9/2006 | Paul et al. |
| 7,155,409 B1 * | 12/2006 | Stroh ............................. 705/37 |
| 7,177,836 B1 | 2/2007 | German et al. |
| 7,340,433 B1 | 3/2008 | Kay et al. |
| 7,496,519 B2 * | 2/2009 | Hahn-Carlson et al. ...... 705/317 |
| 2001/0018739 A1 | 8/2001 | Anderson et al. |
| 2001/0032139 A1 | 10/2001 | Debonnett, Jr. |
| 2001/0037309 A1 | 11/2001 | St.Vrain |
| 2001/0047329 A1 | 11/2001 | Ashby |
| 2001/0047334 A1 | 11/2001 | Nappe et al. |
| 2001/0047489 A1 | 11/2001 | Ito et al. |
| 2001/0051919 A1 * | 12/2001 | Mason ........................... 705/40 |
| 2002/0012445 A1 | 1/2002 | Perry |
| 2002/0013728 A1 | 1/2002 | Wilkman |
| 2002/0013774 A1 | 1/2002 | Morimoto |
| 2002/0023055 A1 | 2/2002 | Antognini et al. |
| 2002/0026394 A1 | 2/2002 | Savage et al. |
| 2002/0038363 A1 | 3/2002 | MacLean |
| 2002/0042756 A1 | 4/2002 | Kumar et al. |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 * | 6/2002 | MacKay ........................ 705/39 |
| 2002/0087452 A1 | 7/2002 | Megiddo |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0120537 A1 | 8/2002 | Morea et al. |
| 2002/0138390 A1 | 9/2002 | May |
| 2002/0138398 A1 | 9/2002 | Kalin et al. |
| 2002/0152133 A1 | 10/2002 | King et al. |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0037002 A1 | 2/2003 | Higgins et al. |
| 2003/0046218 A1 | 3/2003 | Albanese et al. |
| 2003/0097335 A1 | 5/2003 | Muskowitz et al. |
| 2003/0105641 A1 | 6/2003 | Lewis |
| 2003/0110442 A1 | 6/2003 | Battle |
| 2003/0120686 A1 | 6/2003 | Kim et al. |
| 2003/0187789 A1 | 10/2003 | Karas et al. |
| 2003/0191710 A1 | 10/2003 | Green et al. |
| 2003/0208421 A1 | 11/2003 | Vicknair et al. |
| 2003/0208441 A1 | 11/2003 | Poplawski et al. |
| 2003/0220863 A1 | 11/2003 | Holm et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0064409 A1 | 4/2004 | Kight et al. |
| 2004/0078328 A1 | 4/2004 | Talbert et al. |
| 2004/0201735 A1 | 10/2004 | Baron |
| 2004/0228514 A1 | 11/2004 | Houle et al. |

| | | | |
|---|---|---|---|
| 2005/0033690 | A1 | 2/2005 | Antognini et al. |
| 2005/0055254 | A1 | 3/2005 | Schmidtberg et al. |
| 2005/0177480 | A1 | 8/2005 | Huang |
| 2005/0283437 | A1 | 12/2005 | McRae et al. |
| 2006/0095358 | A1 | 5/2006 | Viarengo et al. |
| 2006/0095374 | A1* | 5/2006 | Lo et al. .......................... 705/42 |
| 2006/0155554 | A1 | 7/2006 | Mo |

FOREIGN PATENT DOCUMENTS

| | | |
|---|---|---|
| EP | 0 665 486 | 8/1995 |
| EP | 1014318 | 6/2000 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |
| JP | 2002-133272 | 5/2005 |
| WO | WO 91-16691 | 10/1991 |
| WO | WO 93-08545 | 4/1993 |
| WO | WO 94-28497 | 12/1994 |
| WO | WO 96-08783 | 3/1996 |
| WO | WO 96-12242 | 4/1996 |
| WO | WO 97-14108 | 4/1997 |
| WO | WO 97-45796 | 12/1997 |
| WO | WO 97-45814 | 12/1997 |
| WO | WO 98-09260 | 3/1998 |
| WO | WO 99-10823 | 3/1999 |
| WO | WO 00-18060 | 3/2000 |
| WO | WO 00-39979 | 7/2000 |
| WO | WO 01-75730 | 10/2001 |
| WO | WO 02-063432 | 8/2002 |
| WO | WO 03-100689 | 12/2003 |
| WO | WO 2004-079603 | 9/2004 |

OTHER PUBLICATIONS

Newnes Dictionary of Electronics; 1999; Newnes.
Matyas, Stephen M.; "Digital Signatures—An Overview"; North-Holland Publishing Company, Computer Networks 3; 1979; pp. 87-94.
Buckley, J.P., et al.; "Processing Noisy Structured Textual Data Using a Fuzzy Matching Approach: Application to Postal Address Errors"; Springer-Verlag; Soft Computing 4; 2000; pp. 195-205.
Kesterson, Hoyt L.; "Digital Signatures—Whom Do You Trust?"; IEEE; 1997; pp. 159-170.
Decovny; Net Scope, Banking Technology, May 1997.
Press Release, March 5, 2004, Payment Data Systems Files Patent on Debit Card Payment Solution, American City Business Journals, Inc., Mar. 5, 2004.
Lamond; Credit Card Transactions Real World and Online, Paying by Credit Card- Real World and Online, http:-iwww.virtualschool.edu-mon-electronicproperty-klamond-credit, Printed Jul. 8, 2005, 17 pages.
Carreker; Electronic Check Presentment: Capturing New Technology, http:--proquest.umi.com, Banking Management, Rolling Meadows: vol. 71, Issue 2, Mar.-Apr. 1995, p. 32, 5 pages.
Dupont's Electronic Payments, Corporate EFT Report, V9, N1, Dialog File 636, Accession No. 01066902, Jan. 11, 1989.
Dialog File 20, #10279554; Offer: Book Yourself Free Cassettes; Mar. 25, 2000; Birmingham Post, p. 16.
Terrie Miller and Henry Yan; When Custody Governs, Benefits Canada, Toronto, Feb. 1998, vol. 22, Issue 2, p. 33, 5 pages.
"E-Billing: New Age Electronic Data"; Jul. 5, 2000, Bank Technology News.
Hill, K.; "The Direction of the Industry Part II: Assessing the Leaders in the Industry"; ebillmag.com; editorial; Jul. 2001.
Hill, K.; "The Direction of the Industry Part I: What you need to lead"; ebillmag.com; editorial; Jun. 2001.
Patel, J.; "Business-to-Business E-Billing Heats Up"; Information Week, 246, Oct. 23, 2000.
Patel, J. et al.; "E-Billing Moves into B2B"; Imaging & document solutions; Vo. 10, No. 1; pp. 44-45; Jan. 2001.
Malone, B.; "Internet Billing: Building a Secure Global Market"; Electronic Commerce World, vol. 11; No. 1; p. 46; Jan. 2001.
Leibs, S.; "Internet Billing Gets Its Due"; CFO, vol. 17, No. 2, p. 30; Feb. 2001.

"Business-to-Business EIPP: Presentment Models and Payment Options Part One: Presentment Models"; Jan. 2001; Council for Electronic Billing and Payment.
"Business-to-Business EIPP: Presentment Models and Payment Options Part Two: Payment Options"; Jan. 2001; Council for Electronic Billing and Payment.
Akister, J. et al.; "Electronic Cheque Processing System"; U.S. Appl. No. 09/633,861, filed Aug. 7, 2000.
Pavlik, P.; "Digital Signature System"; U.S. Appl. No. 09/577,660, filed May 25, 2000.
Anonymous; Visa & Carnegie Mellon Plan Online Payment Scheme, Newsbyte News Network, Feb. 15, 1995.
Goode; On Profit, Loss and the Mysteries of the Mind, The New York Times, Nov. 5, 2002.
Fidelity Helps Fund Sellers Trim the Taxes They'll Owe, The Wall Street Journal, Nov. 7, 2002.
Zuckerman; The Hedge-Fund Craze, The Wall Street Journal, Jun. 12, 2002.
Clements, Jonathan; "Harsh Truth: Your Investments Likely Won't Make Any Money"; The Wall Street Journal; Nov. 27, 2002.
McDonald; The Stars in the Sky Flicker, and Fund Stars Do the Same, The Wall Street Journal, Jan. 15, 2003.
Maher and Troutman; Provider's Prescription for Painless Migration to Receipt of Electronic Healthcare Payments and Remittance Advices, PNC Bank, Dec. 2001.
Maher and Troutman; Payor's Prescription for Painless Migration to Electronic Healthcare Payments and Remittance Advices, PNC Bank, Dec. 2001.
CES-Nabanco Introduces Stored Value Card Technology Blockbuster Video Is First Merchant Partner; Business Wire, Inc.; Jan. 15, 1996.
First Data Markets Stored-Value Cards, Cards International, Jan. 30, 1996, p. 5.
Norris; First Data Unit Develops Blockbuster Cash Card, Omaha World Hearld Sunrise Edition, Business Section, Jan. 19, 1996, p. 16.
Blockbuster Running Test of a Stored Value Card, The American Banker, Sep. 1, 1995.
Financial News; Wells Fargo Rolls Out Nationwide Lockbox Check Conversion, PRnewswire Association, Apr. 22, 2003.
Malhotra; Clearing House Enumerates E-Payments Ills, The American Banker, vol. 167, No. 154, Aug. 23, 2002.
Card Flash Daily Payment Card News, www.cardweb.com, Printed Sep. 23, 2004.
Nokia Announces the World's First NFC Enabled Mobile Product for Contactless Payment and Ticketing, PRnewswire, Feb. 9, 2005.
Annual Report Pursuant to Sectin 13 or 15(D) of the Securities Exchange Act of 1934, Form 10-K, Intelidata Technologies Corporation, Fiscal Year Ended Dec. 31, 2001.
Technology, in Brief Wachovia-Intelidata Deal, May 7, 2002.
French; Tech Stocks: Market Movers, Investors Worry Checkfree Being Chased From Its Own Game, http:--www.thestreet.com, Jun. 20, 2002.
Money, Initial Launch to 200 Credit Unions, USA Today.Com, Jun. 27, 2002.
Bills; Chase Pact Done, What's Next for Web Vendors?, The American Banker, Technology Section, Jun. 3, 2002, p. 23.
Anonymous; Chase Manhattan Introduces New FEDI Payables Product, Proquest Document ID: 7806951, ISSN-ISBN: 02686635, May 1995.
Marjanovic; Corporate Services: Chase Gears Up Global Payments System Series: 16, The American Banker, vol. 160, Issue 174, Sep. 11, 1995, p. 41.
Anonymous; Operating in a Multi-Currency Environment, Proquest Document ID 9215937, ISSN-ISBN 09589309, Oct. 1995.
Reinbach; Chase Steps Up Treasury System, Proquest Documednt ID 8723558, ISSN-ISBN:10459472, Nov. 1995.
Anonymous; Chasing the Global Trend, Cash Management News, Proquest Document ID 9319923, ISSN-ISBN: 02686635, Dec. 1995.
Gluck; Creating a Global Cash-Management Game Plan, Bank Systems & Technology, Feb. 1997, p. 28.

* cited by examiner

SYSTEM AND METHOD FOR VARYING ELECTRONIC SETTLEMENTS BETWEEN BUYERS AND SUPPLIERS WITH DYNAMIC DISCOUNT TERMS

CROSS-REFERENCE TO RELATED APPLICATIONS

This patent application is a Continuation of U.S. patent application Ser. No. 12/754,575, filed on Apr. 5, 2010, entitled "SYSTEM AND METHOD FOR VARYING ELECTRONIC SETTLEMENTS BETWEEN BUYERS AND SUPPLIERS WITH DYNAMIC DISCOUNT TERMS," which is a continuation of U.S. patent application Ser. No. 10/155,806, filed on May 24, 2002, now abandoned. The disclosures of these priority applications are hereby incorporated by reference in their entirety.

REFERENCE TO RELATED APPLICATIONS

This application is related to the following United States patent applications:

Method and System for Collaborative Vendor Reconciliation, U.S. patent application Ser. No. 10/155,797, invented by Duc Lam, Georg Muller, Chandra (CP) Agrawal, Baby Lingampalli, Pavel Lopin and Xuan (Sunny) McRae;

System and Method for Electronic Authorization of Batch Checks, U.S. patent application Ser. No. 10/155,800, invented by Duc Lam, Matthew Roland and Xuan (Sunny) McRae;

System and Method for Electronic Payer (Buy) Defined Invoice Exchange, U.S. patent application Ser. No. 10/155,840, invented by Duc Lam, Ramnath Shanbhogue, Immanuel Kan, Bob Moore and Xuan (Sunny) McRae;

Method and System for Invoice Routing and Approval in Electronic Payment System, U.S. patent application Ser. No. 10/155,853, invented by Bob Moore and Xuan (Sunny) McRae; and Method and System for Buyer-Centric Dispute Resolution in Electronic Payment System, U.S. patent application Ser. No. 10/155,866, invented by Duc Lam, Celeste Wyman and Xuan (Sunny) McRae.

All of the foregoing applications are incorporated herein by reference in their entirety.

BACKGROUND OF THE INVENTION

1. Field of the Invention

This invention relates to the field of software and computer network systems. In particular, the invention relates to electronic systems associated with financial transactions.

2. Description of the Related Art

In traditional paper payment systems, an organization or an individual initiates payment by sending a physical check to the party to whom a debt is owed. The check may be sent in response to an invoice from the party to whom the debt is owed. A newer approach is electronic payment. For example, in the consumer context, individuals may be able to make, payment by way of electronic banking. Payment instructions are sent electronically from the individual's computer system to the individual's bank. Payment is then effected by the bank.

Numerous systems now exist relating to accounting and bill payment. For example, computer software is used to track invoices and print payment checks. Payments may be made by wire transfer, with instructions requesting funds of the payer in one financial institution to be transferred to an account of the party to whom payment is to be effected.

Enterprise resource planning (ERP) systems are used for managing the purchases of goods and services. Such systems may have databases of complex and extensive sets of information, such as addresses of various suppliers and similar information related to purchasing. Sellers also use electronic accounting and record keeping systems which may assist in the receipt and tracking receipt of payment for goods and services. Prior systems require considerable amounts of effort to update and maintain, and may lack compatibility with the systems used by parties with whom an organization wishes to engage in transactions. There is thus a need for improved systems to facilitate transactions between buyers and sellers.

SUMMARY

An embodiment of the invention is directed to a method of making payment. A request is received to effect payment between a buyer and a seller for a transaction having established terms. The terms include a payment amount and a settlement date. Messages are exchanged between the buyer and the seller that include an offer and acceptance of new terms for payment other than the established terms. The new terms include an adjusted amount of payment to be made at a particular time after an event associated with the transaction. An electronic notification that the event has occurred is received, and after the notification, payment between the buyer and seller is effected under the new terms. In one implementation, a digital signature indicating acceptance of the new terms is receive. A system may verify such signature before proceeding under the new terms.

According to different implementations, the event may include different forms of electronic notifications. For example, in one implementation, the event includes an electronic indication of approval of the seller's invoice by the buyer. According to other implementations, the event includes an electronic indication that the seller has shipped the goods ordered in the transaction, the buyer has received goods ordered in the transaction or the buyer has authorized payment for the transaction.

The different terms may take different forms. For example, in one embodiment of the invention, the different terms comprise a discount in exchange for payment a particular time between the settlement date and the event. In another implementation, the established terms include a discount date before which the seller is willing to offer a particular discount, and the new terms comprise a discount different from the discount provided in the established terms in exchange for payment a particular time earlier than the discount date. In another implementation, the new terms comprise a discount different from the discount provided in the established terms in exchange for a payment a particular time later than the discount date.

Another embodiment of the invention is directed to a method of making payment according to new terms, where the new terms include an adjusted amount of payment to be made at a particular time after an event associated with an invoice for the transaction. The invoice is received from the seller, and an electronic notification is received that the event associated with the invoice has occurred. After the notification, the payment is effected between the buyer and the seller under the new terms.

Another embodiment of the invention is directed to a method of effecting payment that includes receiving requests to effect a set of transactions with a set of entities. The transactions have established terms. A set of notifications of events associated with the transactions is received. Requests for offers of terms different than the established terms are sent to the entities, and the different terms are to apply to payment made at a particular time after the event. Offers are received in response to the requests, and a set of offers among the offers is selected based on a set of one or more criteria. After the respective events, payment is effected to the respective entities associated with the selected offers under the terms in the respective offers. The set of entities may comprise sellers, and the set of requests for offers may be sent by a buyer's system.

According to different embodiments of the invention, such requests and/or offers may be made differently. For example, according to one implementation, a series of requests to individual entities for offers of terms is made, and oilers are received from individual entities in response to the requests in the series. The requests may be made over time and with terms that are incrementally more attractive to the individual entities. In another implementation, a message is sent to individual entities with a series of different terms among which the entities may select to make the offers of terms. The series of different terms may include sets of proposed amounts of payment and associated dates of the payment. The sets may include multiple proposed amounts of payment associated with at least of some of the proposed dates of payment.

As indicated above, the offers may be selected based on a set of one or more criteria. The set of one or more criteria includes a risk assessment of the respective entity according to one implementation. In another implementation, the set of one or more criteria includes amount of savings per transaction, and in another implementation, it includes amount of time remaining before settlement date in the respective transaction.

Another embodiment of the invention is directed to a method of making payment involving a buyer, seller and a third party. According to one embodiment, the third party is a financial institution, such as a bank. Notification regarding the existence of a transaction between a buyer and a seller is received. The transaction has established terms, which include a payment amount and a settlement date. Messages are exchanged between the buyer, seller and a third party that include an offer and acceptance of new terms for payment other than the established terms. The new terms include an amount of payment to be made by the third party to the seller at a particular time after an event associated with the transaction. Electronic notification is received that the event has occurred. After the notification, payment of the adjusted amount is effected from the third party to the seller under the new terms. After payment by the third party, payment between the buyer and the financial institution is effected under the new terms. Terms are negotiated between third party and buyer are independent of terms between third party and seller according to one implementation. The transaction binds both sellers and buyers. The event includes, according to different embodiments, an electronic indication of approval of the seller's invoice by the buyer, electronic indication that the seller has shipped the goods ordered in the transaction, electronic indication that the buyer has received the goods ordered in the transaction, or electronic indication that the end user at the buyer's organization has received the goods ordered in the transaction.

Another embodiment of the invention is directed to a system for making payment. The system includes a first system associated with a seller and a second system associated with a buyer. The first system includes logic that generates an invoice and sends the invoice to a buyer. The invoice has an associated set of terms. The first system also includes logic that, in response to a request for an offer front the buyer, sends at least an offer to the buyer for a new set of terms other than the terms associated with the invoice. The offer applies to payment after an event associated with processing of the invoice. The second system associated with the buyer includes logic that receives the invoice from the seller and logic that generates and sends to the seller the request for an offer. The second system also includes logic that receives the offer from the seller, logic that sends an electronic indication to the seller accepting the offer from the seller and logic that generates electronic indications of events associated with processing of the invoice. The second system further includes logic that effects payment from the buyer to the seller according to the new terms after receipt of electronic indication of the event associated with the processing of the invoice.

According to a particular implementation, the second system includes logic that sends requests for offers of new sets of terms to systems associated with a plurality of sellers. The offers apply to payment after an event associated with processing of associated invoices, and the new terms are different from previously established terms associated with the invoice. This logic also accepts a subset of the offers and effects payment under the new terms alter the respective events in response to the offers for new terms.

Another implementation of the invention includes logic that selects the subset of offers based on whether a goal has been met. The goal may include an amount of sayings, duration of the goal, or combination of the amount and duration. The goal may also include other criteria such as other financial goals or a combination of goals and tolerance for risk.

In another embodiment of the invention, the first system includes logic that sends requests for offers of new sets of terms to systems associated with a plurality of buyers. The offers apply to payment after an event associated with processing of associated invoices. This logic also accepts a subset of the offers and accepts payment under the new terms after the respective events in response to offers for new terms.

DETAILED DESCRIPTION

Figure 1:
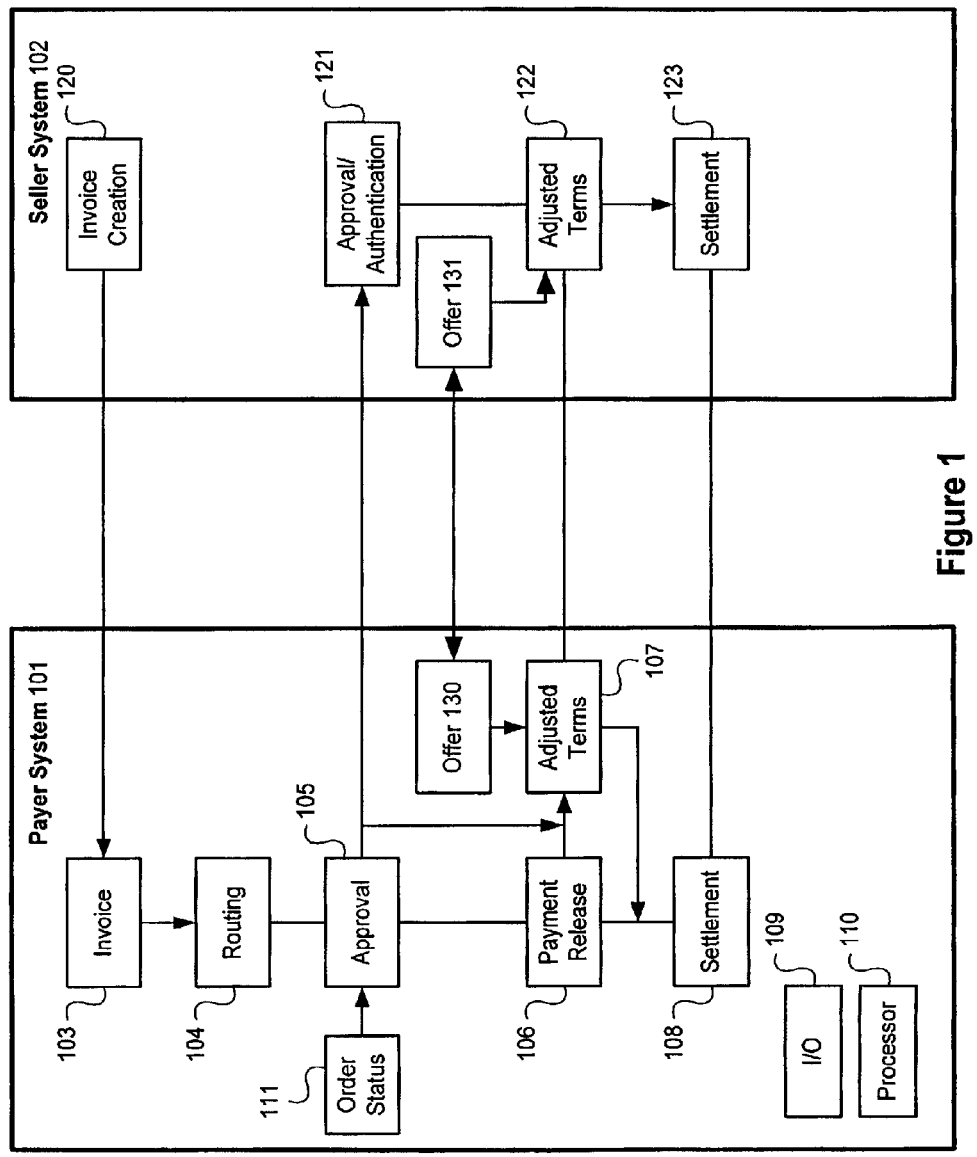
FIG. 1 shows a block diagram of a system for payment with discounts according embodiment of the invention.

An embodiment of the invention is directed to a system for dynamically adjusting the terms of payment in a transaction based on electronic notification of events associated with respective transactions. For example, early payments may be made after receipt of electronic notification of an event such as approval of the respective invoice or release of the payment for the invoice. An offer is made for an adjustment of the terms that apply to payment at a time after the respective event. In one implementation, one entity, such as a buyer, sends requests to a set of entities, such as sellers, for offers of terms different than the established terms between such entity and the respective other entities. In one implementation, the entity that sent the request selects among offers receive from the set of entities based on a goal. The entity that sent the request continues to evaluate offers of new terms until the goal have been reached. After acceptance of an offer, payment is then effected at a time after the respective event under the newly agreed upon terms.

An electronic notification of event may be made based on an action of an employee or other individual in the organization that is making the payment. For example, the event may be the approval by the responsible employee of the invoice associated with the transaction. In one implementation, the response is made through a response to an email notification regarding the invoice received by an employee of the payer organization. The employee is able to approve the invoice based on events regarding the status of the order. For example, the employee may approve the invoice when the employee determines that the goods ordered have been received. Approval of the invoice may alternatively occur automatically. For example, the invoice may be automatically approved when a procurement system sends a notification that the goods have been received and that the invoice data is accurate as compared to the corresponding purchase order.

One embodiment of the invention is directed to making payment at other than the agreed-upon time and on other than the agreed-upon terms at a time after electronic notification of an event regarding status of the respective order. The electronic notification regarding status of the order includes, according to different implementation, electronic notification regarding events that provide different level of confidence that the respective goods or services will be received satisfactorily and that payment will be properly authorized. Such events include the following:

- Purchase order sent from buyer to seller;
- Seller purchases parts on buyer's behalf;
- Parts for order purchased by seller;
- Goods completed by seller;
- Goods completed to a particular percentage of completion;
- Inspection of goods completed;
- Goods designated ready to ship;
- Shipment sent by seller;
- Shipment in possession of a common carrier;
- Shipment received by buyer;
- Other buyer-determined status of shipment;
- Shipment received by end-user individual in buyer's organization who ordered the shipment;
- Service started;
- Service is a particular percentage complete, or service completed;
- Invoice approved by end-user;
- Invoice approved by accounts payable;
- Invoice approved by the responsible manager;
- Final approval of the invoice at the buyer's organization;
- Payments for the invoice approved by accounts payable department in buyer organization;
- Approval received for payment;
- Payment approved for release; and
- Other event defined by the buyer which indicates a particular level of confidence that the goods or service will be satisfactory delivered.

Electronic notification of respective events is provided. In various implementations, super and sub combinations of the above events are available for selection for use to trigger a payment under terms other than the originally agreed terms. For example, in one implementation, the system allows a buyer to trigger payment after any or a subset of the following events: (1) the purchase order sent to the seller, (2) the invoice has been approved and (3) payment has been approved for the respective order. The buyer is then able to select based on risk and other factors which of these events is to be used to trigger payment for particular transactions, particular seller or sets of transactions or sets of sellers.

The buyer and seller may negotiate the new terms for payment based on different factors. For example, based on a simple time value of money based on a selected interest rate calculation, the change in the payment amount can be calculated based on the number of days earlier or later than the originally agreed-upon settlement date that payments occur. An interest rate may be used that extrapolated from the discount provide in the seller's original terms, or the original terms in the original agreement between the buyer and the seller. An advantage of the above approach is that a greater degree of granularity for adjustment of payment terms is provided in certain embodiments of the invention.

One embodiment of the invention is directed to requesting offers from multiple parties for a change or changes in payment terms to make payment on other than the agreed upon terms at a time after electronic notification regarding the status of the order. Such request for offers may be made by a buyer to respect the seller, seller is to respect the buyer or a combination of seller to respective buyers. Parties to whom such requests are sent may be selected based on the sizes of the transaction, potential savings to be received, potential amount of advanced cash flow to be obtained, reference standing at the party, the amount of term left in the transaction and other factors related to confidence with respect to other entities such as the credit rating or experience with the particular party. The selection based on the size of the transaction may be made based on the size of the outstanding transaction with the party in aggregate and alternatively may be made based on the size of individual transactions. Offers may then be accepted based on a goal such as aggregate savings to be achieved or amount of advance in cash flow.

The request for offers may be made as the respective electronic notification of the event occurs. Alternatively, a negotiation may take place between respective parties regarding the type of adjustment to the terms to take place after electronic notification of respective event will occur. For example, a buyer and seller may agree that after the buyer approves the invoice for an order, that the buyer may make early payment and receive an adjustment in the amount owed based on an interest rate and based on the number of days remaining before the originally required settlement date.

FIG. 1 shows a block diagram of a system for payment with discounts according to an embodiment of the invention FIG. 1 includes payer system 101 and payee system 102. Payer system 101 includes computer electronics such as processor 110 and input/output (I/O) 109. Other electronics such as those found in a computer server may be included in payer system 101 according to an embodiment of the invention. Payer system 101 includes routing logic 104 and approval logic 105 which is coupled thereto, Approval logic 105 is coupled with payment release logic 106, term adjustment 107 and order status logic 111, which are also included in payer system 101. Payer system also includes settlement logic 108 which is coupled to payment release logic 106 and settlement logic 123 of payee system 102, and offer logic 130, which is coupled to terms adjustment logic 107 and offer logic 131 of seller system 102. Routing logic 104 of payer system 101 is coupled with an invoice 103 received at payer system 101.

Payee system 102 includes an invoice creation logic 120 which is coupled with invoice 103 of payer system 101. Payee system 102 also includes approval/notification logic 121 coupled with term adjustment 122 and settlement logic 123, which are also included by payee system 102. Additionally, payee system 102 includes offer logic 131, which is coupled to discount logic 122 and offer logic 130 of payer system 101. Payee system creates an invoice using invoice creation logic 120. The invoice is created based on art invoice definition provided by payer system 101, according to one implementation. Invoice 103 is received by payer system 101 from invoice creation logic 120 of payee system 102.

Invoice 103 is routed to the appropriate personnel or mechanisms in order to have the invoice approved and verified for payment. Approval is carried out by approval logic 105, which is coupled with routing logic 104. Approval may be based on the status of the particular order, and such status may be obtained automatically by order status logic 111. Order status may include such items as whether the goods for which the invoice is received have been shipped or whether they have been received by the payer organization. Order status logic 111 may obtain additional information regarding the order status, such as automatically available information regarding the quantity of equipment received based on a just in time (JIT) or other inventory management system. Thus, order status logic 111 may be coupled with an enterprise resource planning (ERP) system. After the respective order is approved, payment made, the payment is released. Such action is carried out by payment release logic 106, which is coupled with approval logic 105.

Offer logic 130 makes a request for an offer of different terms other than those established terms associated with a particular transaction. Upon acceptance of the respective offer, the transaction can be effected under the different accepted terms. Thus, offer logic 130 communicates with terms adjustment logic 107 to adjust the terms that will be applied to the particular transaction or transactions. The request for an offer and receipt of the respective response may be made in advance of the event that will trigger payment, according to one embodiment of the invention. Alternatively, at least some portion of the interaction regarding the offer may be made upon receipt of electronic notification of the respective event, such as after receipt of electronic notification that an invoice for the transaction has been approved in payer system 101. Offer logic 130 may include criteria under which offers are accepted. In such an implementation, an offer is accepted only if it meets the configured criteria. Upon acceptance of an offer for newly defined terms, and after the receipt of electronic notification of the respective event, terms adjustment logic 107 calculates a new settlement date and payment amount. A notification is sent to seller system 102 to indicate acceptance of the offer of the newly defined terms.

Terms adjustment logic 107 implements the respective adjustment to the original payment amount (such as a discount) that is to be made in exchange for an adjusted payment date. Terms adjustment logic is coupled with payment release logic 106 and approval logic 105 so that an adjusted payment may be triggered upon an approval of the invoice or a release of the respective payment. Terms adjustment logic 107 is in communication with discount logic 122 of payee system 102 in order to reconcile the respective discount. Settlement logic 108 settles respective payment between payer system 101 and payee system 102 in communication with settlement logic 123 in payee system 102. Such settlement settles payment of the respective amount minus any discount taken for early payment as determined by terms adjustment logic 107.

The logic modules shown may be implemented in software processes in communication with each other. Some functionality may be shared between different respective modules for design, efficiency and other reasons. Alternatively, aspects of the respective logic modules may be implemented in hardware or a combination of hardware and software. The functions shown may be implemented on a computer system with a processor input/output, such as shown here with processor 110 and input/output (I/O) 109. Thus, payer system 101 may be implemented on a computer server and payee system may be implemented on a different computer server. Alternatively, functions of the payer system 101 and payee system 102 may be implemented on a common server. Functions of the various systems may also be distributed on different computer systems or servers. Such computer systems or servers may communicate through direct links or over a computer network, such as the interne.

Figure 2:
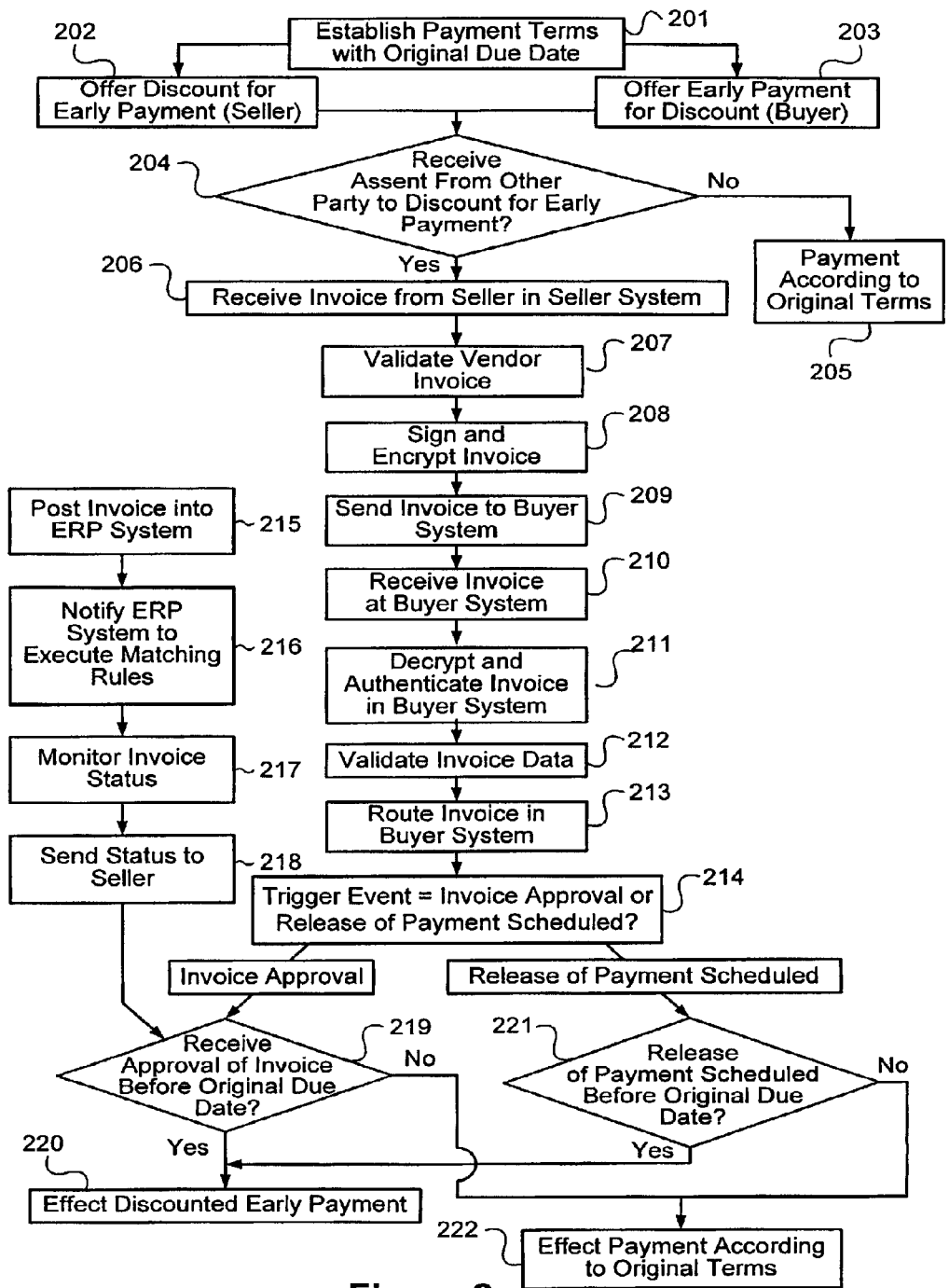
FIG. 2 shows a flow diagram for discounted payment according to an embodiment of the invention.

FIG. 2 shows a flow diagram for discounted payment according to an embodiment of the invention. An offer is made to adjust timing of payment in exchange for adjusting the amount of payment. If the offer is accepted, an invoice is paid according to the newly agreed payment terms. A trigger event is an event after which payment is effected. A trigger event is an event such as approval of the invoice before the original due date or release of payment for the invoice before the original due date.

First payment terms are established with the original due date (block 201). Next an offer is made for the adjustment of terms program. In the case of a seller, the seller offers the buyer a discount in the amount otherwise owed in exchange for early payment by the buyer (block 202). In the case of the buyer, the buyer offers the seller early payment in exchange for a discount from the amount that otherwise would he owed by the buyer (block 203). Such process of offering a discount for early payment is, according to an embodiment of the invention, carried out automatically by a system sending requests to various buyers or sellers for the different terms. If assent from the other party to discount for early payment is not received (block 204), then effect payment according to the original terms (block 205). If assent from the other party to the discount for an exchange for early payment is received (block 204), then proceed to process the invoice and provide the discount. It is possible that other arrangements for adjusting the payment may be established at this stage. For example, the buyer may agree to make payment at a date having a relation to the original settlement date, and after a particular trigger event in exchange for an adjustment in the amount paid by the buyer. In one example, such adjustment is a discount from the payment required under the originally established payment terms.

The terms may also be adjusted by the respective party starting the negotiation making a request for offers of adjusted terms rather than making an offer of adjusted terms. The party making such request then decides to accept or not accept the offers that are received. The exchange of such requests and resulting offers may be made after receipt of the trigger event, according to one implementation of the invention. Thus, in such an approach, the actual times that payment may be made after the trigger event is established and the corresponding amounts of payment to be made on such date or possible dates are proposed. According to another implementation, the offering and campaign process definition/setup is independent of incoming invoices. The trigger events occur when a business document is approved, received, or when other events regarding the document or order occur.

The invoice is received from the vendor in the vendor system (block 206). Such invoice may be created by the vendor based on a set of rules provided by the buyer, according to one embodiment of the invention. Next, the seller invoice is validated (block 207). Such validation may include checking various aspects of the data provided for the invoice. Such validation may be based on a set of rules provided by the buyer, according to one embodiment of the invention. The completed invoice is then signed and encrypted (block 208). The signing of the invoice, according to one embodiment of the invention, is performed using a digital signature of the seller so that the recipient can verify that the invoice has been sent by the seller. The invoice is encrypted to help provide security. Encryption may be performed using a public key/private key scheme and the encryption would be performed using the public key of the recipient. Then the invoice can later be decrypted using the private key of the recipient according to the public key/private key scheme. Next, the invoice is sent to the buyer system (block 209). Such sending may be performed by placing the invoice into an e-mail format and sending that e-mail over an e-mail link between the buyer system and the seller system. Alternatively other forms of electronic communication may be used to send the invoice, such as http post, ftp, electronic data interchange (EDI).

The invoice is received at the buyer system (block 210). The invoice is decrypted and authenticated in the buyer system (block 211). Such decryption may be performed using the private key of the buyer, assuming that the invoice was encrypted using the public key of the buyer. The invoice is authenticated by determining whether it was sent by the seller. Such authentication may involve a public key/private key scheme and, assuming that the invoice was digitally signed by the seller system, is performed using the public key of the seller. The data of the invoice is validated to ensure that it meets certain characteristics preferred by the buyer (block 212). Such characteristics may include "such as the format of the data as well as whether the data in the invoice may have certain values.

Next, the invoice is routed in the buyer system (block 213). The invoice is routed to various recipients within the buyer system in order to receive their input regarding the invoice. Their input may include approval of the invoice or acknowledgement of receipt of the invoice. Based on events such as the approval by recipients in the routing process, a trigger event may occur. A trigger event may also be based on an automatic update regarding the order status. For example, in one implementation, the system automatically determines that the respective goods have been shipped or that the respective service has been commenced. Alternatively, the system automatically determines that the respective goods have been received or that the respective service has been completed. Such determination automatically updates the trigger event. Alternatively, such information may be obtained based on user input through the routing process. A user receives, according to an embodiment of the invention, an electronic notification, such as an e-mail, regarding the respective invoice. The user is then able to respond to the message and indicate a status of the order. For example, an e-mail may be routed to the respective end user of the product that was ordered. The user then, according to one embodiment of the invention, provides an electronic notification to the system indicating that the user has received the goods ordered. In response to such indication from the user, the system may automatically cause the trigger event to occur. Alternatively, the user may indicate approval of the invoice.

A trigger event may be selected from among different type of events. For example, as shown here, the system provides a trigger event of either invoice approval or release of payment scheduled (block 214). The invoice approval may be determined based on a number of factors. As shown, the invoice is posted into the enterprise resource planning (ERP) system (block 215). The ERP system is notified to execute matching rules (block 216). The system monitors the status of the invoice to determine the action taken upon the invoice, such as whether it is approved by the user (block 217), if the invoice is approved, or within a certain amount of time, not approved, the respective status is sent to the seller (block 218). Based on such actions, if the approval of the invoice is received before the original due date (block 219), then the adjusted payment is effected (block 220). If the approval of the invoice is not received before the original due date, assuming that such action is the trigger event, payment is effected according to the original terms (block 222). The adjusted payment may take place upon, or shortly after the trigger event. Alternatively, the early payment takes place some time later after the trigger event but still before the original payment due date.

According to one implementation, a request for an offer of a new set of terms with an adjusted payment is sent after receipt of the trigger event. An offer is received from the seller in response to the request for an offer. The buyer may have proposed the new terms that the seller is to offer. The buyer may determine that it will reject the offer proposed by the seller and instead effect payment according to the original terms.

If the new terms have been accepted, and if the trigger event is release of payment scheduled (block 214), then it is determined whether the release of payment occurs before the original due date (block 221). If the release of payment does not occur according to the original due date (block 221), then payment is effected according to the original terms (block 222). If the release of payment is scheduled before the original due date (block 221), and the trigger event is the release of payment scheduled, then discounted early payment is effected (block 220). The early discounted payment may take place upon, or shortly after the trigger event. Alternatively, the early payment takes place some time later after the trigger event but still before the original payment due date.

Figure 3:
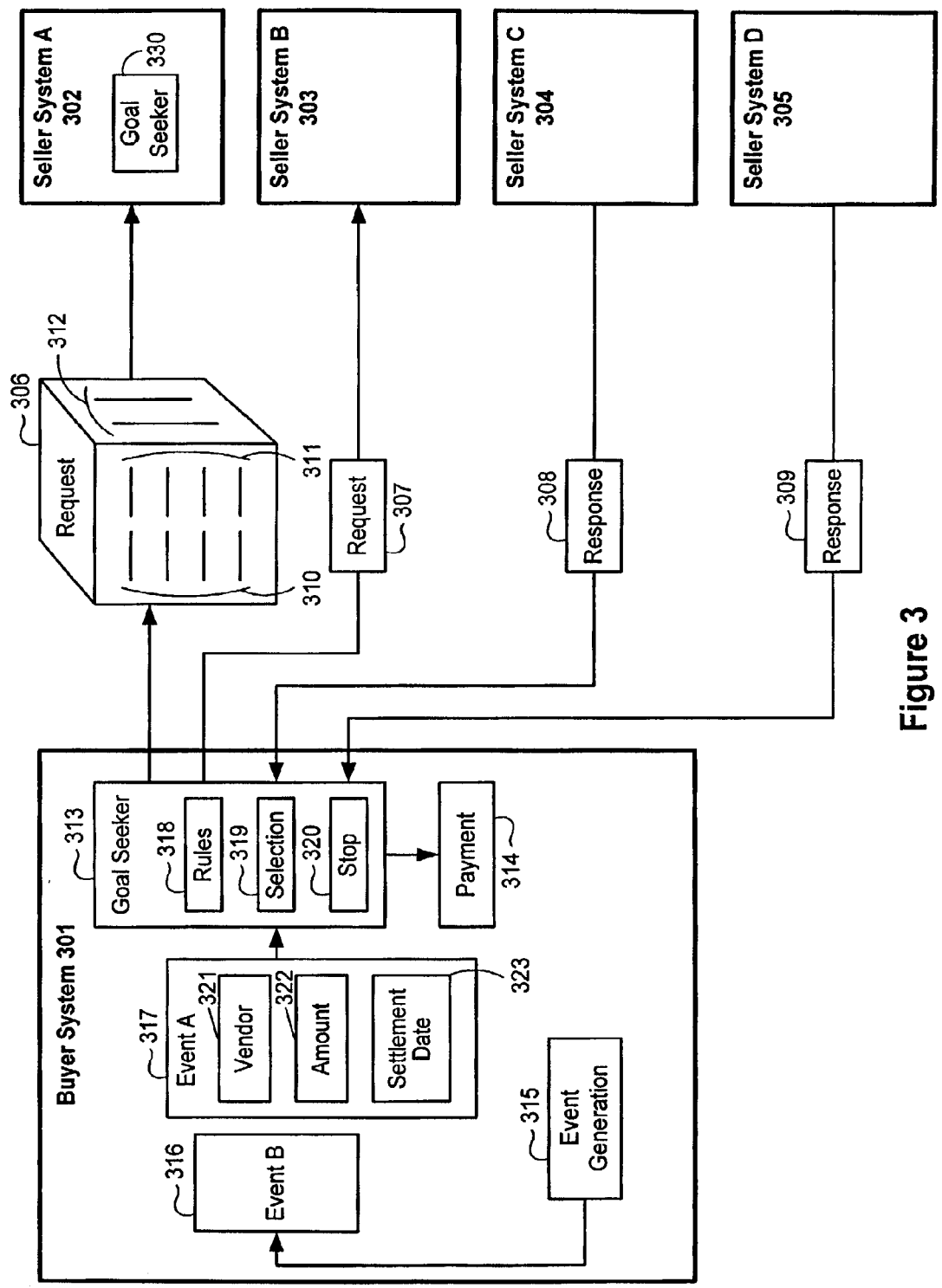
FIG. 3 shows a block diagram of a system for payment with logic to make offers to a set of entities according to an embodiment of the invention.

FIG. 3 shows a block diagram of a system for payment with logic to make offers to a set of entities according to an embodiment of the invention. FIG. 3 includes buyer system 301, seller system A 302, seller system B 303, seller system C 304, and seller system D 305. Also shown in FIG. 3 are set of outcomes 306 and 307 as well as response 308 and 309. Buyer system 301 includes goal seeker logic 313, payment logic 314 and event generation logic 315. Also shown in buyer system 301 are event A 317 and event B 316. Goal seeker logic 313 includes rules 318, selection logic 319 and stop logic 320. Event A 317 and event B 316 each include information regarding the event. For example, event A 317 includes event type 324, identification of the vendor 321, identification of the amount in the transaction 322 and the settlement date 323. Offer request will be sent to proper seller based on vendor identification of the event.

In the system shown in FIG. 3, a buyer, through buyer system 301, makes a set of request for offers of new terms based on electronic notification of events. Buyer system 301 establishes a goal or set of goal to be achieved with the new terms. The goal includes criteria under which the attempts to achieve different terms will stop, and the stopping of the seeking of different terms is controlled, based on such criteria, by stop logic 320. Selection logic 319 determines how often sets of offers with changes in terms are evaluated and selected. Rules logic 318 determines whether an offer is sent to a seller or sellers based on a particular event. Such determination is made based on the identification of the vendor, the amount of payment in the transaction and settlement date.

Request for modified terms are sent to different sellers. As shown here, request 306 and request 307 are sent to seller system A 302 and seller system 8 303 respectively. Responses are received from sellers with offers for changes in the respective terms. For example, response 308 and response 309 are received from the seller system C 304 and seller system D 305 respectively. The request for an offer for a different set of terms may be in the form of a set of outcomes. For example, request 306 includes a set of dates of 310 and corresponding adjusted payments to he made 311. Such a request may have an additional dimension as shown in additional sets of outcomes 312. Such additional sets of outcomes may represent payments based on different interest rate calculations, for example. The seller responds with an offer with a selection of a subset of the set of outcomes. The buyer can then select among this subset and among such offers from varies other sellers.

The sellers may create their response oilers automatically based also on a goal seeking logic, as shown here with goal seeker logic 330 and seller system A 302. Such goal seeking logic may select among the outcomes to make offers based on various criteria. For example, such selection may be made based on credit rating, size of the payment, number of days that the payment is advanced, changed in date of payment versus interest rate or other criteria.

Figure 4:
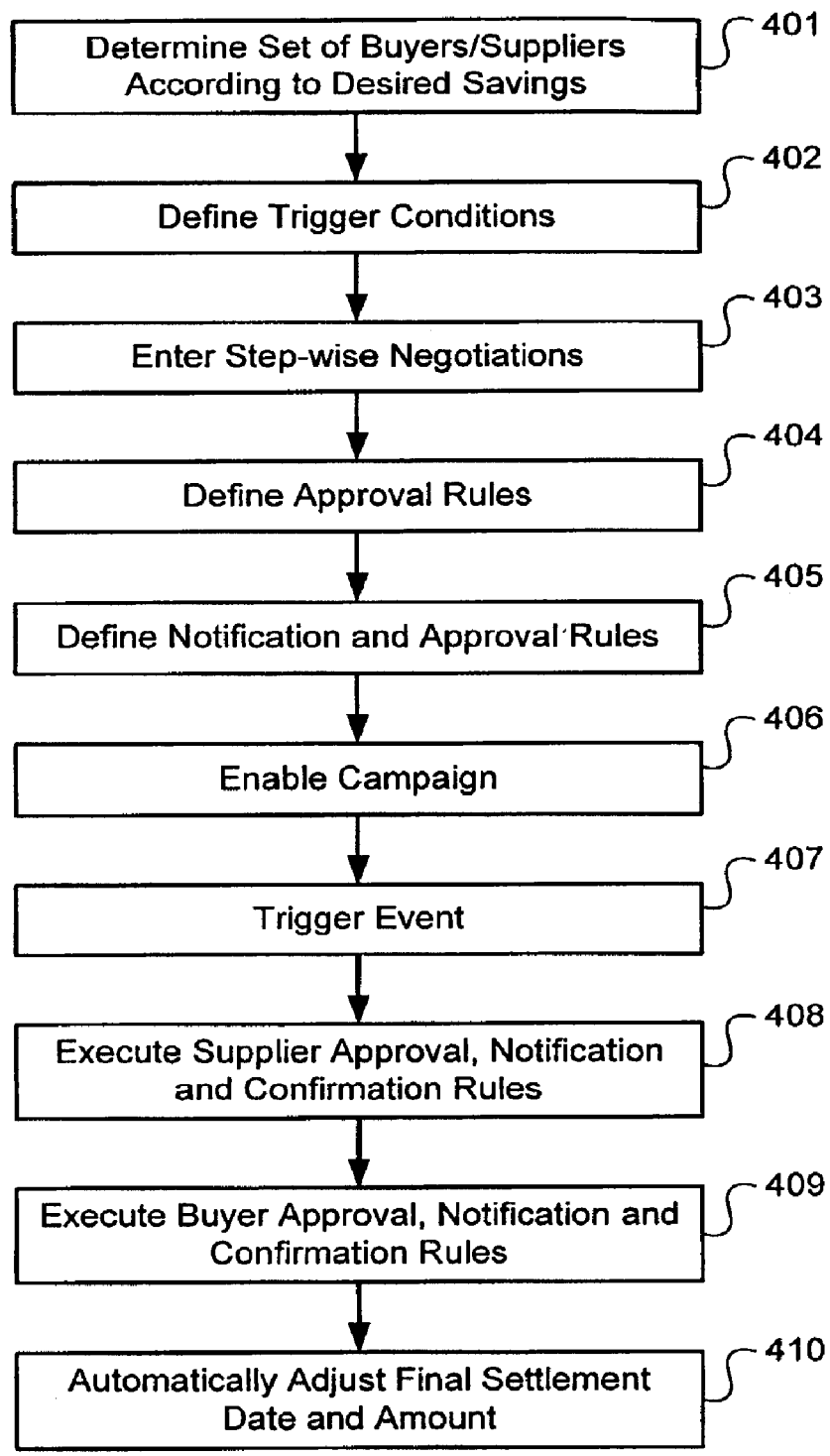
FIG. 4 shows a flow diagram for creation of a campaign for discounted payment according to an embodiment of the invention.

FIG. 4 shows a flow diagram for creation of a campaign or goal seeker for discounted payment according to an embodiment of the invention. A campaign may be undertaken in order to change the terms with a set of buyers or suppliers in order to achieve an earlier payment, for improved cash flow, or, as a buyer, to achieve reduced overall payments in exchange for making payments on an earlier schedule.

First, a set of buyers or suppliers is determined according to the desired savings (block 401). Such determination may be made in view of the respective amounts owed to a set of suppliers and the time before such payment is due. If the remaining time left before such payments are due is great enough, there is a potential for negotiating a significant discount in such payments. Based on the prevailing interest rates, and amount of outstanding balances, a set of buyers or suppliers may be selected to achieve the desired savings. In the case of suppliers, a set of buyers having substantial enough amounts owed to the supplier may be selected as candidates for early payment. This set may be selected based on the amount of payments outstanding and the remaining time for such payments. Selection may be made based on first choosing the set of organizations haying the largest outstanding balances and the most time remaining on such balances. Alternatively, one factor such as the amount of balances or time on such balances may be preferred over the other in various embodiments of the invention. Different subsets of buyers or sellers may be established based on various factors such as credit ratings, size, length of relationship or other factors. Then different rules for response are established for each group of buyers or sellers depending on the nature of the group.

Trigger conditions are defined (block 402). Such trigger conditions may be approval of the invoice or release of payment. Other trigger conditions may be selected in alternative embodiments of the invention. Negotiations are entered to achieve different payment terms in exchanging discounted payment for earlier payment. Such negotiations, according to an embodiment of the invention are performed in a step-wise manner (block 403). Such negotiations are performed by providing a series of offers for progressively better terms to the other party. For example, according to one embodiment of the invention, a buyer automatically offers successively earlier payments in exchange for a particular discount. Alternatively, a buyer oilers successively lesser discounts in exchange for a particular early payment. In one embodiment of the invention a seller offers successively greater discounts in exchange for a particular earlier payment schedule. In an alternative embodiment, the seller offers successively later payment schedule in exchange for a particular discount. Combinations of such offers may be used in alternative embodiments of the invention. In one implementation, the negotiation takes place after the trigger event (discussed below).

Next, define a set of approval rules (block 404). Such rules determine when the respective invoice is in a status such that it is sufficiently certain that the goods are received or the services have been rendered that the buyer can reliably guarantee payment (block 404). For example, depending on the rule, different trigger conditions may apply to different parties e.g. different sellers, or different buyers or different groups depending on the rules established. Next, notification and approval rules are defined (block 405). Such rules determine upon what conditions notification is provided regarding the status of the order. Examples of such rule include: wait for signed approval from particular individual (CFO, etc) if amount is greater than certain amount, auto approval if no approval action has not received in number of business days, or other rules. After such definition, the campaign can be enabled (block 406). Then, when such campaign is enabled, a trigger event occurs (block 407) and supplier approval, notification and confirmation rules are executed (block 408). Similarly, buyer approval, notification and confirmation rules are executed (block 409). In response, the final settlement date and amount are automatically adjusted (block 410).

Figure 5:
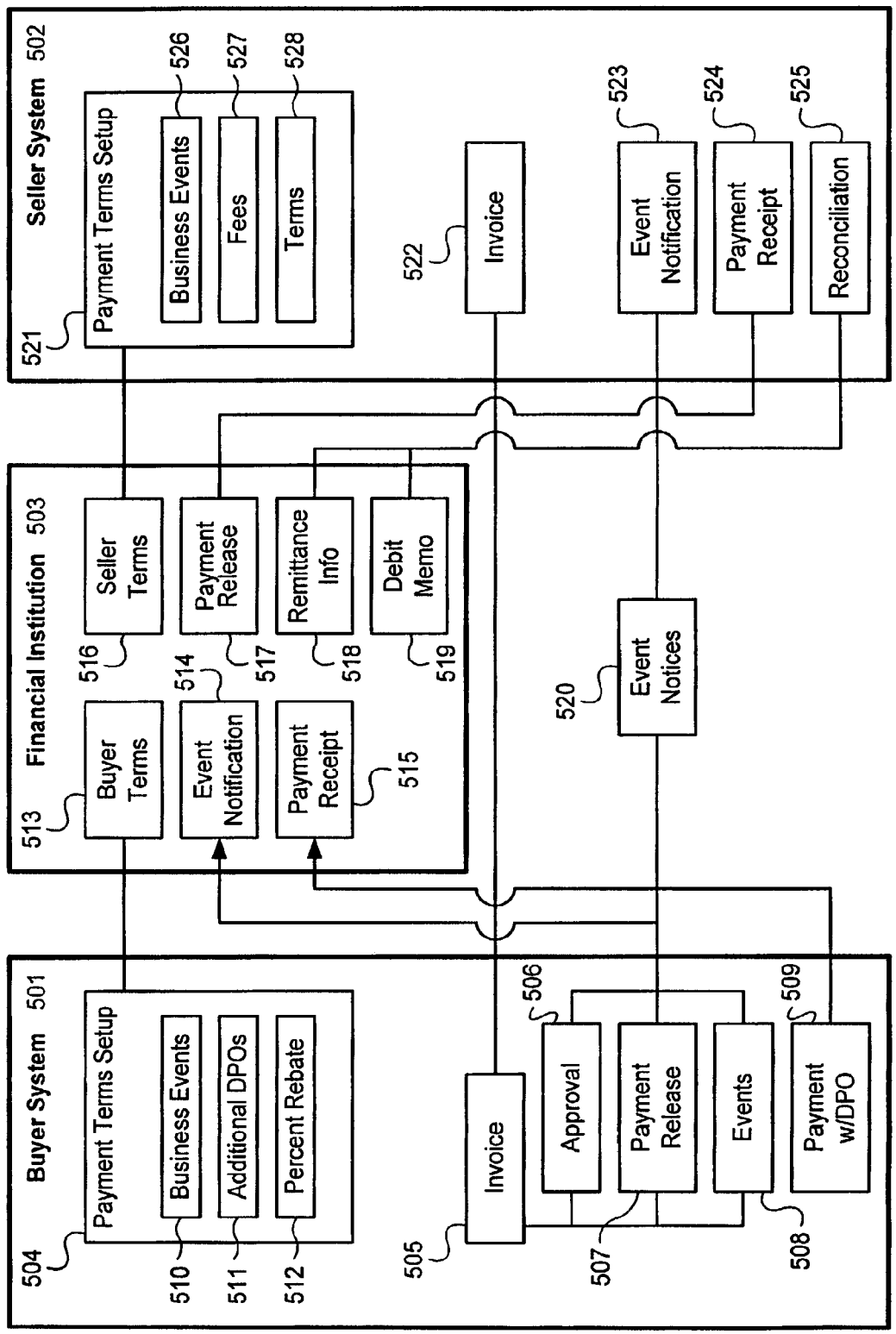
FIG. 5 shows a block diagram of a system for discounted payment involving a financial institution according to an embodiment of the invention.

FIG. 5 shows a block diagram of a system for discounted payment involving a third party such as financial institution according to an embodiment of the invention. A financial institution is involved in order to allow a seller to receive early payment for its electronically invoiced accounts. The seller system receives early payment upon or after a trigger event, such as approval of the invoice or release of payment by the buyer. The seller receives this payment from a financial institution at this earlier date. The buyer makes payment to the financial institution later. The payment received by the seller from the financial institution is discounted, and the payment made by the buyer to the financial institution is at a higher amount than what the financial institution pays to the seller.

The system shown in FIG. 5 is one embodiment of the invention to effect such transactions. The system shown includes a buyer system 501, seller system 502 and financial institution system 503. Buyer system includes payment terms setup logic 504, invoice 505, approval logic 506, payment and release logic 507, events logic 508 and payment with dates payable outstanding (DPO) logic 509. Payment terms setup logic 504 is coupled with buyer terms 513 of financial institution 503. Invoice 505 on buyer system 501 is coupled into approval logic 506 and payment release logic 507. Approval logic 506 is coupled with payment and release logic 507 and events logic 508. Approval logic 506, payment and release logic 507 and events logic 508 are coupled into event notices logic 520 which is coupled with event notification logic 523 of seller system 502. Approval logic 506, payment release logic 507 and events logic 508 are also coupled with event notification logic 514 of financial institution 503. Payment with dates payable outstanding logic 509 is coupled with payment and release logic 507 and approval logic 506. Logic 509 is also coupled with payment receipt logic 515 of financial institution 503.

Financial institution 503 includes buyer terms logic 513, event notification logic 514, payment receipt logic 515, seller terms logic 516, payment release logic 517, remittance information logic 518 and debit memo logic 519. Seller terms logic 516 is coupled with payment terms setup logic 521 of seller system 502. Payment release logic 517 is coupled with payment receipt logic 524 of seller system 502. Remittance information logic 518 is coupled, along with debit memo 519, to reconciliation logic 525 of seller system 502.

Seller system 502 includes payment terms setup logic 521, invoice generation logic 522, event notification receipt logic 523, payment receipt logic 524 and reconciliation logic 525. Payment terms set up logic 521 includes business events logic 526, fees logic 527 and terms logic 528.

Payment terms are set up between a buyer and a financial institution. The system facilitates such negotiation and set up with payment terms setup logic 504 and buyer terms logic 513. Payment terms setup logic determines the set of business events, days payable outstanding and percentage rebate provided under the agreed upon terms. Such setup is performed respectively by business events logic 510, additional DPOs logic 511 and percent rebate logic 512 respectively. After such terms are set up, they are stored by buyer terms: logic 513 to be available to automatically set the respective terms in future financial transactions.

Negotiation occurs between the financial institution and the seller. Seller terms logic 516 and payment terms setup logic 521 facilitates such negotiation and sets up the respective terms between the financial institution and the seller. The setup of the payment terms includes determination of the respective business events giving rise to the early payment, the fees charged by the financial institution to the seller for the early payment and the terms under which such payment is made. Such setup is performed by business events logic 526, fees logic 527 and terms logic 528 respectively.

The tasks performed by the logic shown in the systems shown may be performed by software programs. The software programs may run in modules in the organization shown. Such software may, according to various embodiments of the invention, be implemented as different schemes of software modules and/or classes or processes according to different system and communication requirements. According to one embodiment of the invention, buyer system and seller system are implemented on separate servers each with respective computer processor or processors. Alternatively the respective systems may be implemented on a common server or a distributed set of servers. Other implementations are possible such as in a distributed network environment.

After the terms have been set up between either the buyer system and financial institution or the seller system and financial system or a combination thereof, transactions may be performed using the new terms. According to one embodiment of the invention, only one of either the buyer or seller enters into an arrangement with the financial institution. According to another embodiment of the invention, both buyer and seller enter into arrangements with the financial institution to change the payment terms from the original payment terms.

An invoice is generated by seller system 502. As shown here, invoice 522 is created. Such invoice may be created and validated based on a definition of the invoice and rules for the invoice provided by a buyer or buyer system. The invoice is transmitted to the buyer system and received, as shown here as invoice 505. The invoice is subject to approval and other factors such as validation. Approval is performed by approval logic 506. When the invoice reaches the appropriate status payment may be released as performed by payment release logic 507. The event for which payment is released may be indications received from the users that the goods have been received and that appropriate management has approved the expenditure. Other events regarding the status of the invoice and order are recorded and transmitted by events logic 508. Notices of events such as approval, payment release and other events are transmitted to event notification logic 514 in financial institution 503. This allows financial institution to base payment to the seller system on the appropriate event the buyer system. Event notices are also transmitted as event notices 520 to event notification logic 523 of seller system. Payment is made from buyer system 501 to financial institution 503 by payment with DPO logic 509. This logic makes payment to the financial institution instead of the seller system because the seller is paid directly by the financial institution. Payment is made at the full amount of the invoice or some amount greater than the amount paid by the financial institution to the seller.

Seller system 502 receives payment in payment receipt logic 524 from payment release logic 517 of financial institution 503. Assuming the proper trigger event has occurred before the expiration date of such event, this payment is made at a time earlier than originally scheduled under the original terms between the buyer and the seller. The payment however is made at a discounted amount to account for the time value of money in having the payment made at an earlier time. Reconciliation logic 525 of seller system 502 reconciles the various records of payment including the original invoice records and other payment records with respect to remittance information transmitted from remittance info logic 518 and debit memo logic 519 of financial institution 503.

Figure 6:
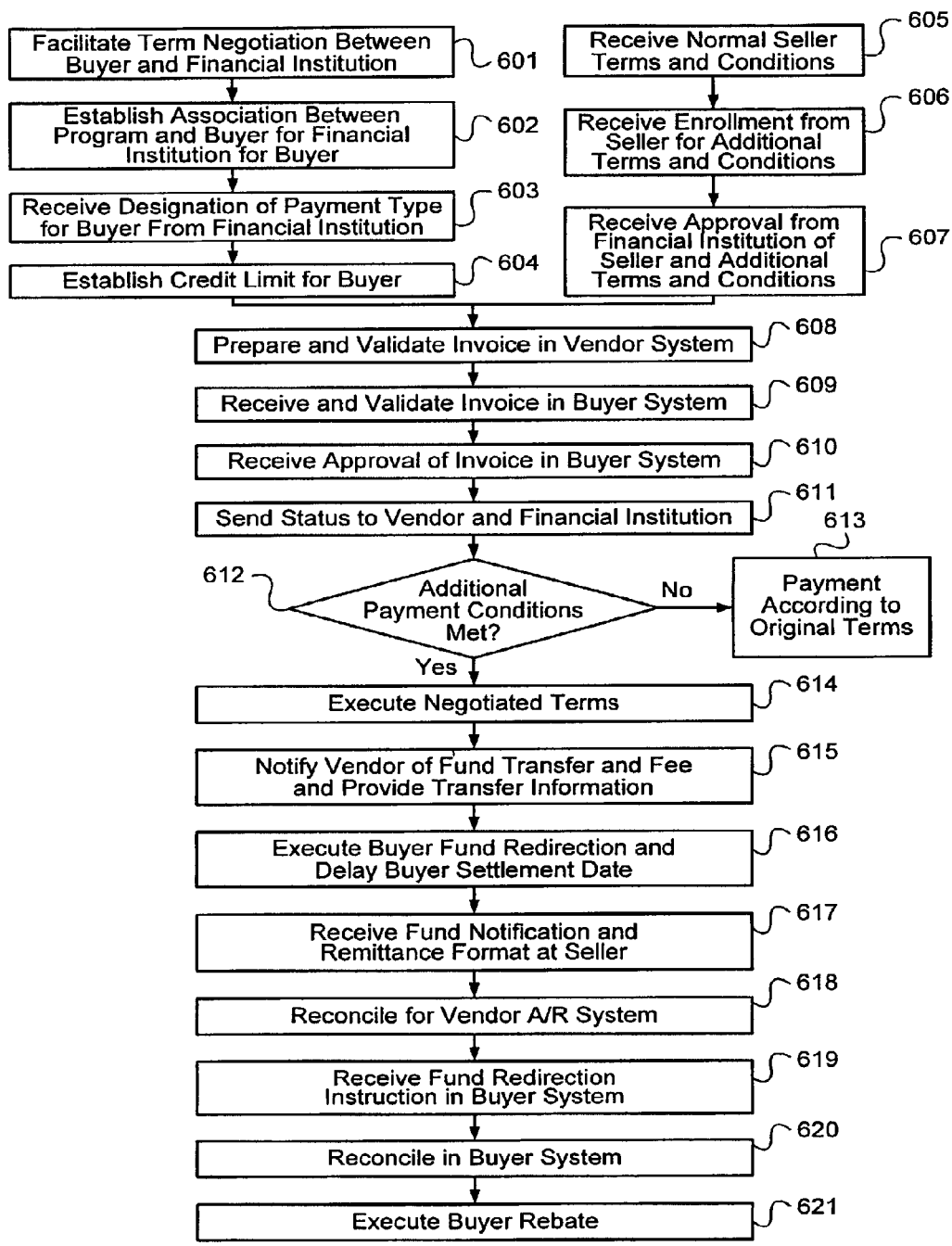
FIG. 6 shows a flow diagram for discounted payment involving a financial institution according to an embodiment of the invention.

FIG. 6 shows a flow diagram for discounted payment involving a financial institution according to an embodiment of the invention. Terms are set up between a buyer and a financial institution allowing the buyer to make payment to the financial institution according to the normal payment schedule or later. Terms are set up between the seller and the financial institution allowing for the seller to receive payment earlier than the normal scheduled payment time in exchange for the financial institution paying the seller only a discounted amount of the original agreed upon payment amount.

The system facilitates negotiation of terms between the buyer and the financial institution (block 601). An association is established between an incentive program providing such payment terms and a buyer for the financial institution (block 602); this includes type of trigger events (invoice approval, good received, etc.), additional days payable outstanding (DPO) rebate percentage and/or other terms. The system receives a designated payment type for the buyer from the financial institution (block 603). The payment type defines how the financial institution will collect payment on behalf of the seller (e.g., credit to financial institution is sent by buyer, or financial institution will automatic debit from buyer's account according to different optional approaches). The financial institution has various payment types that are available for use by the buyer and a selection of the type agreed upon between the buyer and the financial institution is received. A credit limit is established for the buyer (block 604). Such credit limit may be determined based on a number of standard factors for determining credit. Additionally, the credit limit is established based on an analysis of the security of allowing for payment to the seller based on certain trigger events such as approval of the respective invoice by the buyer. Such events present a different risk profile than other types of events more typical of bank financing.

The following relate to setting up the vendor for financing. The normal vendor terms and conditions are received (block 605). Enrollment is received from the vendor for the additional terms and conditions with the financial institution (block 606). These additional conditions may include event type, discount rate, new term/due, and/or whether fixed or interpolated. Next, the approval is received from the financial institution of the vendor and the additional terms and conditions (block 607). Such approval may be based on various financial criteria regarding the vendor and the terms and conditions. Additionally, the approval may be based on an analysis of the security of basing payment to the vendor on particular events such as electronic approval of the invoice by the buyer or electronic notification of release of payment by the buyer. Based on the particular events selected and the type of notification, an analysis is made of the credit risk and appropriate financing terms are provided.

After the credit terms and agreement are established between the buyer and the financial institution and the seller and the financial institution, payment may be effected using the system, Payment is effected between the financial institution and the seller and between the buyer and the financial institution. An invoice is prepared and validated in the vendor system (block 608). The prepared invoice is received and validated in the buyer system (block 609). The approval of the invoice is received in the buyer system (block 610). Such approval may be made based on a selected set of factors such as approval by respective employees of the buyer system as described herein. The status is sent to the vendor and financial institutions (block 611). Such status may include the status of approval, release of payment or other events regarding the invoice and the respective order based on events received by and generated in the buyer system. In particular, notification of the trigger event upon which adjusted payment terms are based is sent to the vendor and financial institution.

If the additional payment conditions that are agreed upon for the new payment terms between the financial institution and buyer and seller respectively are not met (block 612), then payment is made according to original terms (block 613). If the additional payment conditions are met (block 612), then the negotiated terms are executed (block 614). The vendor is notified of the fund transfer and fee and is provided transfer/remittance information (block 615). Such fund transfer is at a discounted amount discounted from the original agreed upon payment between the buyer and the seller. The fee may be a discount from the full amount. Alternatively the fund transfer is a discounted amount and a separate fee is not charged. In yet another alternative, the fund transfer is the full amount minus the respective fee. Later, the buyer fund redirection is executed and the buyer settlement date is delayed as agreed between buyer and financial institution (block 616). The buyer funds are redirected to the financial institution instead of to the seller.

Next, receive fund notification and remittance format at seller (block 617). The fund notification indicates that the funds have been transferred to the seller. Remittance format is the format of remittance information provided by the buyer with respect to the payment. Reconciliation is then performed for the seller account receivable (A/R) system (block 618). Fund redirection instruction is received in the buyer system (block 619). The reconciliation then occurs in the buyer system (block 620). Later a rebate is executed according to one implementation (block 618). Such rebate is based on the collective savings incurred by the financial institution in receiving larger amounts of payment from buyer and making lesser amounts of payments to the respective sellers for the respective transactions taking into account the discounted value of the amounts paid later by the buyer and a profit for the financial institution. Providing, a rebate may be an optioned feature.

Payment of the funds will be transferred based on seller's preferences, which may preferably include single or combination of mechanism ranging from paper check to electronic clearing house centers (ACH, VISA, credit card, etc). Fund availability will notified by email to suppliers. Remittance information will be available to the seller in multiple media (paper, email, or online) as well as different A/R formats that are defined by suppliers (EDI, PeopleSoft, SAP, Oracle Financials, etc). These remittance files can be used by suppliers to reconcile with various Enterprise Resources Process (ERP) systems.

Figure 7:
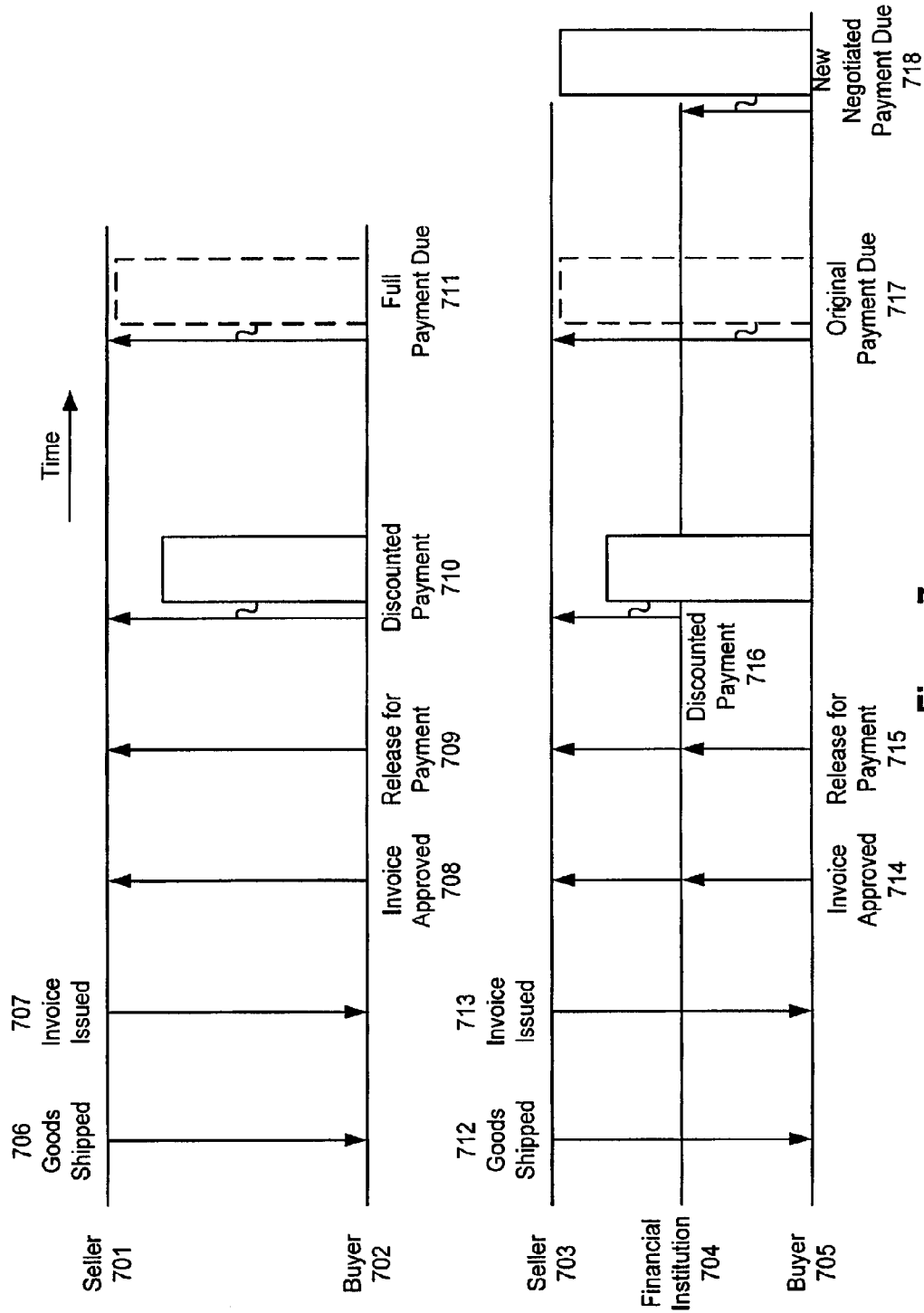
FIG. 7 shows a timing, diagram for discounted payment according to an embodiment of the invention.

FIG. 7 shows a timing diagram for discounted payment according to an embodiment of the invention. FIG. 7 shows two timelines for transactions between buyer and seller. The first timeline includes seller 701 and buyer 702. The second timeline includes seller 703, financial institution 704 and buyer 705. The timeline for seller 701 includes the following seller actions: goods shipped 706 and invoice issued 707. The timeline for buyer 702 includes the following buyer actions: invoice approved 708, release for payment 709, send discounted payment and full payment due date 711.

The following is a description of events according to the first timeline. First goods are shipped (action 706). Alternatively, similar actions may be taken based on other actions of the seller, such as performance of a service. Other actions such as receipt of goods approval and inspection of the goods or other actions related to the goods or services may trigger events according to this scheme. An invoice is then issued by the seller (action 707). A buyer later approves the invoice (action 708). Later, the buyer releases payment (action 709). The buyer provides a discounted payment (action 710) which is less than the full payment that would otherwise be due at a later point in time. Such full payment that otherwise would be due is shown as full payment due date 711. Buyer pays full payment to financial institution as new agreed full payment due date 718.

The following are examples of payment in selected situations. The examples are for illustration and are not intended to limit the invention.

Example 1

| | |
|---|---|
| PO Issued | Day −6 |
| Invoice Submitted | Day 0 |
| Invoice Amount | $100,000 |
| Supplier terms for this buyer | 2% 10, Net 30 |
| Buyer terms for this supplier | 2% 10, Net 30 |
| Early Pay Discount Capture Threshold | Day 10 |
| Invoice Due | Day 30 |
| Trigger notification: Invoice Approval | Day 12 |
| Payment Method: ACH | ACH |
| Processing Method Delay | 2 Days |
| Funds Available In Supplier Account | Day 14 |
| Calculation Method | Simple |
| Days Early Relative to Due Date | 16 Days |
| Effective Discount. | 1.60% |
| Discount Amount | $1,600 |
| Payment Amount | $98,400 |

In this example 1, an invoice is submitted to the buyer on day 0. The supplier's terms for payment on this invoice are 2%, 10, net 30, meaning the supplier is willing to offer the buyer a 2% discount if the buyer pays within 10 days, else pay the full amount in 30 days. In this example, the buyer's terms for this supplier match the suppliers terms. The trigger event in this example is invoice approval, whereby notification regarding the trigger event occurs on the 12$^{th}$ day relative to the date of invoice submission. Note this is two days past the early pay date as defined by the agreed upon terms. Because both parties have expressed a willingness to extend the discount capture opportunity throughout the due date horizon (from 10 to 30 days), we can apply a numerical method to extrapolate the early payment amount, adjusting for the actual trigger date+delays of the chosen payment method, which in this example is 2 days. Also note that in this example, simple interest is used, but other methods such as present value or time value of money formulas can be used. The actual settlement date relative to the due date is the 14$^{th}$ day (12 days for invoice approval+2 days for payment processing delay), or alternatively, 16 days earlier than the full term of 30 days. Discount logic using the aforementioned numerical method is applied (2% for 20 days early is equivalent in the method to 1.6% for 16 days early). Therefore, a payment is issued to the supplier in the amount of $98,400 scheduled to be available in the suppliers bank account on the 14$^{th}$ day relative to the invoice submission date Example 2

| | |
|---|---|
| PO Issued | Day −8 |
| Invoice Submitted | Day 0 |
| Invoice Amount | $100,000 |
| Initial Supplier terms for this buyer | 1.5% 10, Net 30 |
| Buyer terms for this supplier | 2% 10, Net 30 |
| Adjusted Supplier terms for this buyer | 1.75% 10, Net 30 |
| Adjusted Buyer terms for this supplier | 1.75% 10, Net 30 |
| Early Pay Discount Capture Threshold | Day 10 |
| Invoice Due | Day 30 |
| Trigger notification: Invoice Approval | Day 2 |
| Trigger notification: Terms agreement | Day 4 |
| Payment Method: ACH | ACH |
| Processing Method Delay | NA |
| Days Early Relative to Due Date | 26 Days |
| Base Discount Rate | 1.75% |
| Base Number of Days Early | 20 |
| Effective Daily Rate | 0.0875% |
| Calculation or lookup method | Simple |
| Effective Discount Rate (Daily Rate * # of Days Early) | 2.28% |
| Actual Discount | $2,275.00 |
| Payment Amount | $97,725.00 |

In this Example 2, an invoice is submitted to the buyer on day 0. The supplier's terms for payment on this invoice are 1.5%, 10, net 30, meaning the supplier is willing to offer the buyer a 1.5% discount if they pay within 10 days, else pay the full amount in 30 days. At the time of submission, however, the buyers terms for this supplier are higher in that the buyer is "offerings" 2% 10, Net 30. The trigger event in this example is invoice approval, whereby notification regarding the trigger event occurs on the 2nd day relative to the date of invoice submission. Recognizing the disparity in terms, the supplier enters a new term to "meet the buyer halfway", at 1.75% 10, net 30. The buyer responds to this "offer" or "adjustment" in the supplier's term on day 4 by adjusting his own term to meet the 1.75% 10, net 30. The buyer also indicates in his discount logic preferences to use this new rate going forward for this supplier. Note a payment method delay as was presented in Example 1 may be avoided. Note that extrapolation logic can be applied for days prior to the early payment due term or "early payment threshold" depending upon the specific deployment of the invention with respect to "extrapolation" preferences resident in the discount logic. In this example, agreed upon terms are 1.75% 10, Net 30, and this agreement occurs on day 4, and discount logic determines that payment should be made as early as possible, adjusting amounts for differences in relative days, in this example, payment is initiated on day 4, or 26 days early from the scheduled due date. If the parties agree to a rate of 1.75% in exchange for payment 20 days early (30 days less 10 days), then mathematically we can extrapolate using simple interest or other numerical method such as net present value to determine the effective discount rate and discount amount, in Example 2, this adjusted discount rate is 2.28% to reflect the payment of the invoice faster than the defined early threshold.

Example 3

| | |
|---|---|
| PO Issued | Day −4 |
| Invoice Submitted | Day 0 |
| Invoice Amount | 100,000 |
| Supplier terms for this buyer | 14% APR, Net 30 |
| Buyer terms for this supplier | 14% APR, Net 30 |
| Invoice Due | Day 30 |
| Trigger notification: Invoice Approval | 14 |
| Payment Method: ACH | ACH |
| Processing Method Delay | 2 |
| Days Early Relative to Due Date | 14 Days |
| Effective Daily Rate | 0.0384% |
| Calculation or lookup method | net present value |
| Net present value discount factor | 0.54% |
| Actual Discount | $534.12 |
| Payment Amount | $99,465.88 |

In this Example 3, discount terms are represented as an annualized rate of return, or interest rate, or, as businesses commonly refer to them, internal hurdle rates. In conjunction with this interest rate is the net due date of the invoice. Using these two numerical data points the system can extrapolate the appropriate discount depending upon the timing of a valid trigger event relative to the invoice due date. As with the other methods, we can use a variety of calculation methods, like simple interest or net present value. Example 3 utilizes Net Present Value in the calculation. Example 3 illustrates that both buyer and supplier have agreed upon the same set of terms, which is a 14% annual percentage rate and a invoice due date at day 30. In this example, the invoice is approved on day 14, or 16 days before the actual due date. Note, however, that Example 3 employs the use of the payment method factor, which is 2 days, effectively adjusting the early pay date to 16 days after submission of the invoice, and 14 days before it is due. This 14 days becomes the basis of our discount calculation. Using the APR of 14%, we can generate an effective daily rate of 0.0384% (14/365). Applying this rate over a 14 day period translates to 0.537% (14*0.00384). The net present value of the calculation, given a future value of $100, 000 on day 30, using, 537% as the rate of discount over 1 period yields a present value of $99,465.88, or a discount amount of $534.12

Example 4

| | |
|---|---|
| PO Issued | Day −4 |
| Invoice Submitted | Day 0 |
| Invoice Amount | $100,000 |
| Supplier invoice due term | 30 days |
| Buyer invoice due term | 30 days |
| Supplier discount terms, day 1 through 10 | 2% |
| Supplier discount terms, day 11 through 15 | 1.50% |
| Supplier discount terms, day 16 through 22 | 1% |
| Buyer discount terms, day 5 through 10 | 2.50% |
| Buyer discount terms, day 11 through 15 | 1.50% |
| Buyer discount terms, day 16 through 22 | 1.25% |
| Trigger notification: Invoice Approval | 5 |
| Payment Method: ACH | ACH |
| Processing Method Delay | 2 |
| Discount Applied (based on lookup value) | 1.50% |
| Scheduled settlement date | Day 15 |
| Actual Discount | $1,500.00 |
| Payment Amount | $98,500.00 |

In this embodiment of the invention, utilization of a discrete value lookup is used in place of the continuous range calculation offered by the methods described above. In example 3, both the buyer and supplier ha re entered into the discount logic engine a series of terms to be referenced depending upon when the trigger event takes place. As the table illustrates, the supplier has entered a discount amount that should be applied if an invoice is approved between 1 and 10 days, a different rate between 11 and 15 days. etc. The buyers defines a rate for days 5-10, 11 to 16 etc. In example 4, the invoice was approved on day 5, with an: NCH processing delay of 2 days, resulting in the early pay date at day 7. Because 7 falls in the supplier's range of 1-10 days, and the buyers range of 5-10 days, those respective discount rates are referenced and checked for agreement. In this instance, they do not agree, upon which the discount logic references the next available opportunity in the list, which in these case is day 11-15 for both buyer and supplier. Note from the table that there is agreement in discount amount for this range of days. Therefore, the payment will be scheduled to settle on or before the 15$^{th}$ day and after the 11$^{th}$ day for a 1.5% discount.

The second timeline shows interaction between the parties including a financial institution 704. Goods are shipped from the seller 709 to buyer 705 (action 712). Next, an invoice is issued by the seller (action 713). Invoice is approved by buyer 705 in event invoice approved (action 714). The invoice approval notice event is provided to financial institution 704 as well as seller 709 so that financial institution can base payment to seller on the approval of the invoice. Next, payment is released (action 715). A notification of such release is provided to seller 709 as well as financial institution 704. Such notice is provided to financial institution 704 so that financial institutional may optionally trigger payment to the seller based on the release of payment by the buyer. A discounted payment is made from financial institution 704 to seller 709 (action 716). Later, a full payment is made between buyer 705 and financial institution 704 (action 718). Such payment may, in an alternative embodiment of the invention, equal the payment less than the full amount but larger than the amount made by the financial institution to the seller. Such payment may also be made at a time (action 718) that is later than the original payment due date (action 717).

Example 5

| | Buyer 1 | Buyer 2 |
|---|---|---|
| PO Issued | Day −4 | Day −5 |
| Invoice Submitted | Day 0 | Day 0 |
| Invoice Amount | $100,000 | $200,000 |
| Supplier Terms | 2% 10, Net 30 | 2% 10, Net 30 |
| Buyer Program | 60 Day Payable, No rebate | 50 Day Payable, 10% of Discount |
| Trigger notification: Invoice Approval | 5 | 5 |
| Payment Method: ACH | ACH | ACH |
| Processing Method Delay | 2 | 2 |
| Days Early Relative to Due Date | 23 Days | 23 Days |
| Effective Daily Rate | 0.1000% | 0.1000% |
| Calculation or lookup method | Simple | Simple |
| Effective Discount Rate | 2.30% | 2.30% |
| Actual Discount | $2,300.00 | $4,600.00 |
| Payment Amount | $97,700.00 | $195,400.00 |
| Net Result: Bank pays this supplier: | $293,100.00 | |
| Bank Reimbursement | $100,000 | $200.000 |
| Bank Rebate to Buyer (for simplicity, bank cost of capital is ignored because this is a % of Discount Program and not a % of Profit program) | None | $460.00 |

In example 5, a bank is paying the supplier on behalf of two buyers who have received and processed invoices from this supplier. The table shows the trigger events within the buying organizations occurred on day 5 relative to the due date. Adjusting for payment method delay places the early pay opportunity at 23 days. With an effective daily discount rate of 0.1% (2% for 20 days early=0.1% per day), the effective discount rate applied to each invoice is 2.3%. For buyer 1, this translates to a discount of $2,300, and $4,600 for buyer 2. Subtracting the discount amounts from the original invoice amount yields net payments of $97,700 and $195,400 for buyer one and two, respectively. Also note, because the financial institution is making payment to a single supplier in this example, the payments can be consolidated into one or initiated separately depending upon the financial institutions preferences. The financial institution receives $100,000 from buyer I on day 60, and $200,000 from buyer 2 on day 50 in addition, note that buyer 1 is not subject to receiving a rebate from the financial institution. Buyer 2 in this instance will receive a rebate in the amount of $460, or 10% of the discount capture rate. Note, the bank can apply different methods to the calculation such as adjusting the $460 down based on cost of capital and duration the credit is outstanding, which in this case could be 20 days (50 days-30 days (original due date of invoice). Also note that the numerical or lookup methods discussed in Examples 1-4 can also apply to the banking oriented embodiment of the system.

Figure 8:
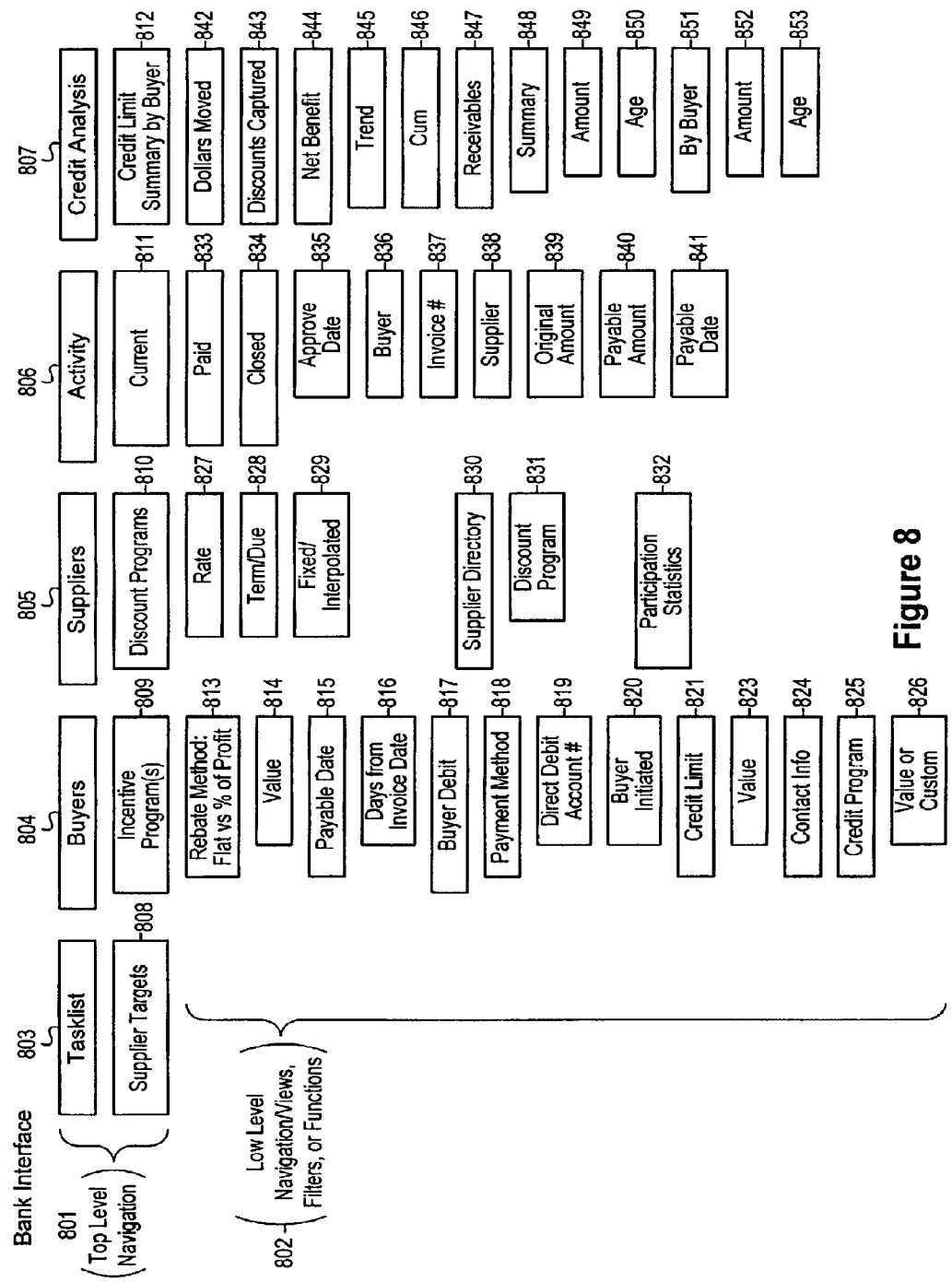
FIG. 8 shows a user interface for a banking system according to an embodiment of the invention.

FIG. 8 shows a user interface for a banking system according to an embodiment of the invention. The bank interface includes top level navigation inputs 801 and low level navigation/views, filters or functions 802. The major actions that the bank is able to take according to this interface include those associated with task list 803, buyers 804, suppliers 805, activity S06 and credit analysis 807.

The following are the actions available in the different respective categories. Under task list 803 is available supplier targets 808 Under buyers 804 is available incentive programs 809, buyer debit $17, credit limit 821, contact information 824 and credit program 825. Within incentive programs is available rebate method, which includes flat versus percentage of profit options 813 and payable date 815. Rebate method 813 includes value 814. Payable date includes days from invoice date 816. Buyer debit 817 includes payment method 818, credit limit 821, contact information 824 and credit program 825, Payment method 818 includes direct debit account number 819 and buyer initiated 820. Credit limit 821 includes value 823. Credit program 825 includes value or custom 826.

The following actions are included under suppliers 805 discount program 810, supplier directory 830 and participation statistics 832. Under discount program 810 is included rate 827, term/due 828 and fixed/interpolated 829. Under supplier directory 830 is included discount program 831. Under category activity 806 is included current 811, paid 833 and closed 834. Under closed 834 is included approved date 835, buyer 836, invoice number 837, supplier 838, original amount 839, payable amount 840 and payable date 841.

Under category credit analysis 807 is included credit limit summary by buyer 812, dollars proved 842 discounts captured 843 and net benefit 844. Under net benefit is included trend analysis 845, cumulative summary 846 and receivables 847. Under receivables is included summary 848 and by buyer 851. Under summary 848 is included amount 849 and age 850. Under buyer 851 is included amount 852 and age 853.

Bank interface includes various options that allow the bank to manage and analyze its program of making payments for sellers and receiving payments from buyers. For example buyers 804 allows for the bank to analyze the various programs that are set up for respective buyers. The programs shown may be available in various combinations in various embodiments of the invention. Similarly, category suppliers 805 allows for the bank to analyze its programs offered for various suppliers. Such analysis may be provided for each respective supplier and also for the programs that are available in general to the bank with respect to suppliers. As with the other categories, various combinations or sub combinations of the features shown, including with additional elements, may be provided in different implementations. Category activity 806 allows for the bank to analyze various pending activities with respect to the discount programs offered and managed by the bank. Credit analysis category 807 allows for the bank to conduct various forms of analysis on these programs. The analysis may take the form of the types shown or other combinations, sub combinations or super combinations of these elements.

Figure 9:
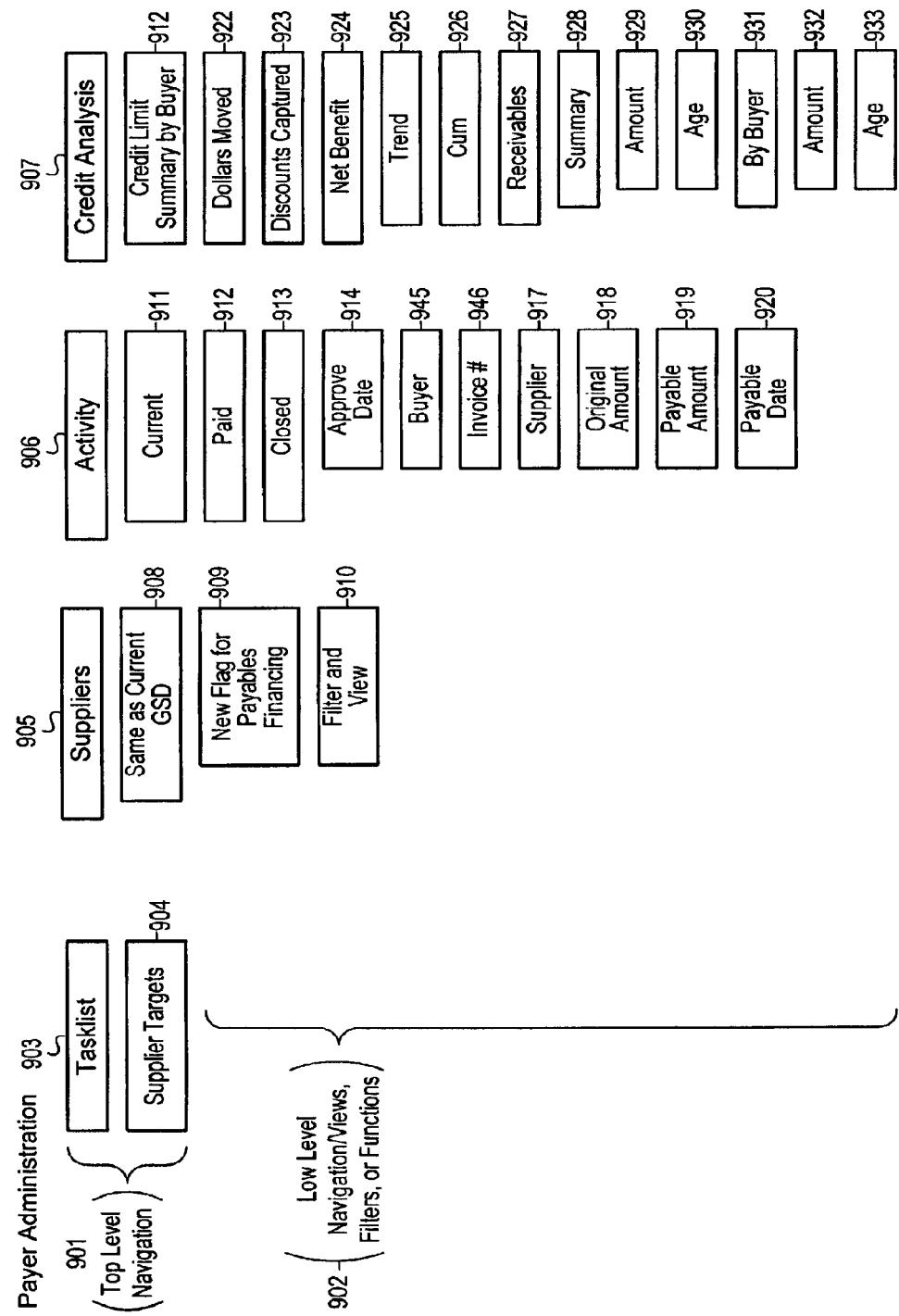
FIG. 9 shows a user interface for a payer system according to an embodiment of the invention.

FIG. 9 shows a user interface for a payer system according to an embodiment of the invention. Payer administration interface includes top level navigation actions 901 and low level navigation/views, filters, or functions 902. Top level navigation 901 includes the following categories: task lists 903, supplier 905, activity 906 and credit analysis 907. Task list 903 includes supplier targets 904.

Suppliers 905 includes same as current GSD 908. Same as current GSD 908 includes new flag for payables financing 909 and filter and view 910. Category activity 906 includes current 911, paid 912 and closed 913. Closed 913 includes approve date 914, buyer 913, invoice number 916, supplier 917, original amount 918, payable amount 919 and payable date 920.

Category credit analysis 907 includes credit limit summary by buyer 921, dollars moved 922, discounts captured 923 and net benefit 924. Category net benefit 924 includes trend analysis 925, cumulative analysis 926 and receivables analysis 927: Receivables analysis includes summary 92$ and by buyer 931 Summary 928 includes amount 929 and 930. By buyer 931 includes amount 932 and age 933.

Payer administration may be used by a buyer to display potential candidates suppliers with whom a program of discounts may be engaged. The various actions shown allow for the buyer to filter among the set of suppliers that the buyer works with to find potential suppliers for whom various levels of savings may be achieved through earlier payment and reciprocal discounts. For example filter and view 910 allows for identification of suppliers selected by various filters. Such filters may be based on the potential savings for the respective suppliers. Activity 906 allows for analysis of current payment activity. Credit analysis 907 allows for analysis of the use of discounts to achieve savings. Such savings may be displayed in various forms as shown.

This interface shows current on-going activity and balance with regarding to buyer and suppliers. There complete sections: current, close, and paid. The current section displays invoices that match defined criteria awaiting approval to be executed. The paid section displays invoices that currently has been paid to suppliers and awaiting buyer re-emburse-ments. The close section displays all completed transactions.

Figure 10:
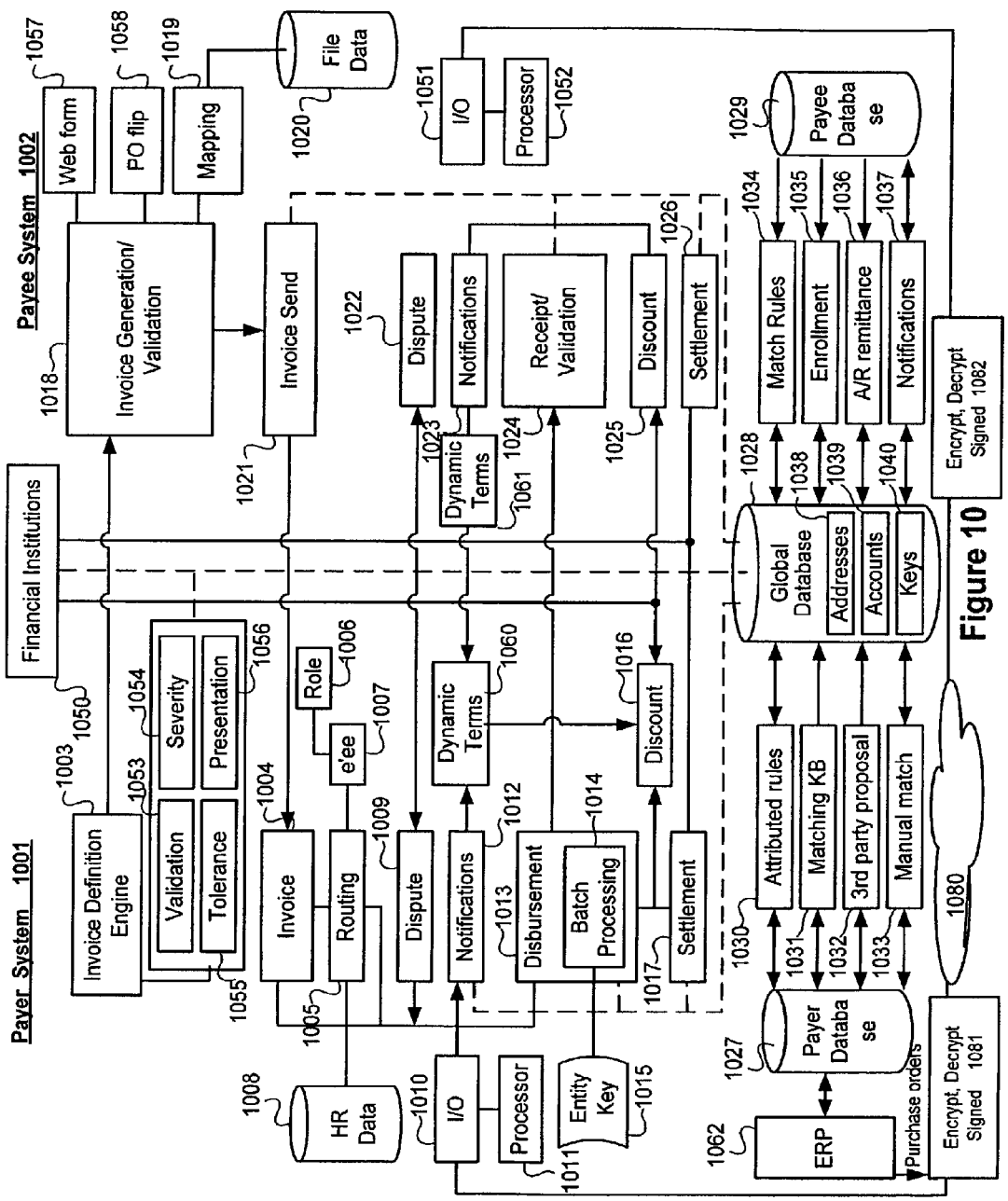
FIG. 10 shows a system for electronic payment according to an embodiment of the invention.

FIG. 10 is a block diagram of a system according to an embodiment of the invention. The system allows a paying entity to define the invoice format for invoices it wishes to receive. The system facilitates routing, editing, dispute resolution, and disbursement of payment. The system includes payer (buyer) shown as 1001, payee (vendor) shown as 1002, and financial institutions shown as 1050. The system has the following characteristics according to one implementation: collaborative network model, A/P (buyer) centric enterprise software, plugging into existing ERP systems, full cycle bill-to-pay functionality, web-based A/R (vendor) software, and co-existence with the customer existing bank relationships.

The collaborative network model supported by the unique collaborative vendor reconciliation engine between global directory shown as 1028 and A/P centric master vendor list shown as 1027. The reconciliation engine provides methods of matching existing vendor name/address with self enrolled vendor information in the global directory. These methods include: fuzzy attributed weight based matching shown as 1030, previous vendor histories of matching in the knowledge based shown as 1031, third party outsourced recommended matching proposal shown as 1032, and manual interactive selection from buyers shown as 1033. Each vendor is represented by several critical attributes in the global directory: addresses shown as 1038, real and alias accounts shown as 1039, and keys shown as 1040. Vendor entries are pre-populated with information uploaded from the buyer ERP system. The vendor enrolls via the online self-service enrollments 1035. Vendor also provides additional rules to match 1034, A/R remittance format attributes 1036, and notification rules/addresses 1037.

Accounts payable (A/P) buyer-centric enterprise software associated with payer system 1001 includes several key unique functions. These functions include buyer defined electronic invoice exchange, routing/editing and approval, and dispute resolution. Payer system 1001 includes invoice definition engine 1003, invoice 1004, HR organization data 1008, routing/editing logic 1005, dispute logic 1009, notifications logic 1012, disbursement logic 1013, dynamic terms logics/offers 1060, discount logic 1016 and settlement logic 1017. Also included on payer system 1001 are input output (I/O) 1010, processor 1011, entity key 1015, and payer central repository database 1027. The invoice definition engine 1003 includes validation logic 1053, tolerance/replacement items 1055, interaction severity 1054, and several presentation forms 1056. This definition engine is controlled by payer helps provide clean invoice data from payees. The definition logics (1053, 1054, 1055, and 1056) can be configured to specific payee or a specific group of payees.

Invoice definition engine 1003 and its definition logics are exposed to payee via global directory and are operative with invoice definition generation/validation 1018 of payee system 1002. The routing/editing logic 1005 includes business logic that governs how an invoice will be processed by AP clerks, and what data entry information will be required to complete the transaction. Routing/editing logic 1005 can operate differently based on multiple attributes: document type, document value, discount value, etc. Routing/editing logic 1005 acts on HR organization database 1008 to define routing/editing/approval work flow based on employee information 1007 and role values 1006. Invoice 1004 is coupled into routing logic 1005/Routing logic 1005 is coupled with employee logic 1007 and role assignment 1006. Routing logic 1005 is coupled with HR data 1008 and with dispute logic 1009, notifications logic 1012 and disbursement logic 1013 of payer system 1001. Notification logic 1012 is configured by the payer, and includes collaborative filtering, and mappings status and notification definitions between internal o external payees. These collaborative filtering and mappings can be designated to a payee or a group of payees.

Dispute logic 1009 is set of payer defined centric collaboration rules and interactions between payer and payee to resolve issues related to invoice or other exchanged documents. Some disputes are simple (e.g., number of items is received, etc.) while others are more complex (e.g., replacement items do not meet part specification and price). The outcomes of a dispute are partial payments, partial invoices, new invoices, or other outcomes. According to one implementation, a dispute can only he finalized by payer and its members, and some finalized exchanges will require digital signature to ensure non-repudiation. The payer dispute logic 1009 orchestrates with payee dispute logic 1022. Payer dispute logic, references, and history are stored in payer central repository 1027.

A/R web based centric software associated with payee system 702 helps provide an online self-service payee system. Payee system 702 includes a processor 1052 and input/output (I/O) 1051. Such processor 1052 and input/output 1051 allow for communication with other entities such as payer system 1001, financial institutions 1050 and global database 1028. Processor 1052 and processor 1011 of payee 1002 and payer 1001 respectively may run various software processes to implement the logic shown. The processes may be implemented as software objects, routines or other software processes, programs or implementations. Alternatively, portions of such logic may be implemented in hardware logic or other forms of logic. The functions shown may alternatively be implemented on a common server or in a distributed set of computer systems separated over a computer network, or other configuration that achieves the logical functions shown. Data and information such as for global database 1028 may be stored in data structures or other data format and stored in computer memory, fixed storage or other data storage or archived in various implementations of the invention.

Payee system 1002 includes invoice generation/validation logic 1018, invoice send logic 1021, dispute logic 1022, notifications logic 1023, receipt/validation logic 1024, discount logic 1025 and settlement logic 1026. Invoices or other documents can be submitted to payer via multiple mechanism. Three sample mechanisms are shown here: Web forms shown 1057, purchase order pre-populated invoice (PO flip) 1058, and electronic file submission via file mapping 1019. The Web forms 1057 are a set of payer defined presentations that can be selected and/or authorized to be used by payee(s). Payee can also define additional payee private attributes and fields to be used during A/R matching as well as graphic materials (such as company logo, etc). The PO flip 1058 uses information from purchase orders which are transmitted to payee from payer to pre-populate the invoice data. The status of each purchase order is maintained within the payee central repository to support blanket purchase orders. File mapping 1019 is used by the payee to automate the bulk invoice submission process. Normally, these file are exported from payee's A/R system. The mapping defines bow payee's data will be mapped into payer, as well as default/validation/transformation rules. Upon submission of these invoices or other documents via multiple mechanisms (1057, 1058, 1019). The documents are validated based on the payer definition engine 1018. This definition engine 1018 includes payer definition engine 1003 and its components: validation 1053, severity 1054, tolerance 1055 and presentation 1056.

Invoice generation/validation logic 1018 is coupled with mapping logic 1019 in communication with the data 1020. Invoice generation/validation logic 1018 is coupled into invoice send logic 1021. Dispute logic 1022 is coupled with dispute logic 1009 of payer system 1001. Notifications logic 1023 is in communication with notifications logic 1012 of payer system 1001 and discount logic 1025 of payee system 1002. Receipt/validation 1024 of payee system 1002 is in communication with disbursement module 1013 of payer system 1001. Settlement logic 1026 is operative with discount logic 1025 of payee system 1002 and receipt/validation logic 1024.

Global database 1028 is available to notifications logic 1012 and 1023, disbursement logic 1013, settlement logic 1017 and 1026, invoice send logic 1021, receipt 1021 and receipt/validation logic 1024. Global database 1028 is in communication with payer database 1027 through attribute match rules 1030, knowledge based history matching samples 1031, third party recommendation/proposal 1032 and manual interactive matching by payers 1033. Global database 1028 is in communication with payee database 1029 through match rules 1034, enrollment logic 1035, remittance formats 1036 and notification preferences 1037. Global database includes items such as address 1038, accounts 1039 and public keys 1040. Payer database 1027 is located with payer system 1001 and payee database 1029 is located with payee system 1002. Global database 1028 is also available to financial institutions 1050.

Through invoice definition engine 1003 a payer uses payer system 1001 to define the invoice that the payer wishes to receive. Such definition helps to increase efficiency in the payer system because the resulting invoice from the payee, such as a seller, is more likely then in the proper data format when it is received. Payee system 1002 generates an invoice based on the defined invoice in invoice generation/validation logic 1018. The input data for the invoice is validated based on the invoice definition rules defined in payer system 1001. If file data is used to automatically map into an invoice, such mapping is performed in one embodiment of the invention by mapping logic 1019. Mapping logic 1019 receives the file data 1020 with information to be populated into respective invoices. File data 1020 may contain files with data for invoices for various payers who have purchased good or services from the payee. When an invoice is completed it is sent through invoice send logic 1021 to payer system 1001. Additional information regarding definition of invoice by the buyer and use of related invoice rules is contained in United States patent application entitled System and Method for Electronic Payer (Buyer) Defined Invoice Exchange, U.S. patent application Ser. No. 10/155,840, invented by Duc Lam, Ramnath Shanbhogue, Immanuel Kan, Bob Moore and Xuan (Sunny) McRae, which is incorporated herein by reference in its entirety.

An invoice is received at payer system 1001 as shown here with invoice 1004. The invoice is routed to the respective employees or other agents for its review and approval. Some approval may require additional signatures according to one embodiment of the invention. As shown here, employee logic 1007 is in communication with routing logic 1005 to allow an employee to authorize, audit or view respective invoice car check information.

Routing logic 1005 is also used to route checks or other documents to various employees for signature or approval using HR data 1008. Routing logic 1005 uses HR data 1008 to determine the correct employees to whom to route the respective document, such as in an invoice or check. Routing may be made to the manager of a respective employee if the employee has not responded in a certain time to the document. Such the choice of such manager to whom to route is made based on the management hierarchy in the organization stored in HR database 1008. Such database is extracted from a human resource management system (HRMS), in one implementation of the invention. Additional information regarding routing of documents in the system is described in United States patent application entitled Method and System for Invoice Routing and Approval in Electronic Payment System, U.S. patent application Ser. No. 10/155,853, invented by Bob Moore and Xuan (Sunny) McRae, which is incorporated herein h reference in its entirety.

A user of payer system 1001 may dispute an invoice or other payment request through dispute logic 1009. Dispute logic 1009 is in communication with dispute logic 1022 of payee system 1002. This allows for communication regarding a dispute between a payer and a payee. The dispute may be only initiated and finalized by a payer. According to one embodiment of the invention, the dispute may be finalized only by the buyer, or the payer system. The dispute includes the capability to indicate that particular items in an invoice are disputed, such as the tax. The dispute logic 1009 and 1022 include the capability for individuals using the payer system 1001 using payee system 1002 to engage in a chat dialog. For additional discussion regarding electronic dispute resolution in such a system, refer to United States patent application entitled Method and System for Buyer-Centric Dispute Resolution in Electronic Payment System, U.S. patent application Ser. No. 10/155,866, invented by Duc Lam, Celeste Wyman and Xuan (Sunny) McRae, which is incorporated herein by reference in its entirety.

Notifications logic 1012 communicates completion of various stages of approval or other issues of status regarding invoices and disbursement. For example, when an invoice is approved notifications logic 1012 communicates a notification to notifications logic 1023 of payee system 1002. Based on such notifications, a discount may be enabled through discount logic 1016, which is in communication with discount logic 1025 of payee system 1002. For example, where an invoice is approved, a discount may be enabled based on an agreement or outstanding dynamic terms offers shown as 1060 that the corresponding payment is made earlier than required under the original terms and conditions. Dynamic terms are additional real-time terms, a set of rules, and/or goal seeker that are established by payer 1060 or payee 1061. These dynamic terms rules 1060 and 1061 are based on business event types (invoice approval, purchase order approval, etc.}, a payee or group of payee and a set of new discrete or variable terms. These dynamic term goal seekers allow payer and payee to set desirable outcomes. These dynamic terms can be pre-negotiated up-front or in real-time based on business event types. The approval of these new terms may require digital signature of either payer or payee. Also, third party financial institutions could be involved to provide funding for payee in returns for early discounts.

To facilitate complete bill-to-payment functionality, the system in FIG. 10 includes disbursement logic 1012 and settlement logic 1017. Disbursement logic 1013 includes all payment routing, signing, and approval logic for respective invoices or other requirements for payment. Some payments will require multiple signatures to be signed based on payment amount and/or destination payee(s). Digital signatures and nondigital signatures may both be used. Also, payer can configure to control new settlement date for the payment by defined payee group and number of business/calendar days to be adjusted. The disbursement logic also includes auditing capability with multiple levels based on number of signatures and/or amount in one implementation, disbursement logic 1013 makes such disbursement in the form of electronic checks in one implementation. Such electronic checks are generated and signed with a digital signature. The digital signature may be obtained from respective users such as through a routing process using routing logic 1005 to obtain a signature from employee logic 1007 with role assignment digital key 1006.

Alternatively, a set of instructions may be received to send a set of checks that use a digital signature of the payer organization rather than the digital signature of an employee. Such check processing may be accomplished through batch processing logic 1014 and disbursement logic 1013. Such batch processing logic 1014 uses an entity key 1015, which is a private key of the payer's organization. Batch processing logic 1014 requires particular authorization for the respective instruction. The authorization may require that the agent requesting the set of checks sign the instruction with the agent's private key. Receipt/validation logic of payee system 1002 is in communication with disbursement logic 1013. Receipt/validation logic 1024 receives payment, such as in the form of electronic checks. Such electronic checks are validated to assure that they are accurate, Receipt/validation logic decrypts any encrypted documents, for example if the electronic checks are encrypted with the public key of payee system 1002, such checks are decrypted. Additionally, the digital signature of the sender is authenticated in receipt/validation logic 1024. Such authentication is accomplished using the public key of the payer, which corresponds to the private key of the payer's organization (entity key 1015) that was used in batch processing logic 1014 (entity key 1015). Additionally, verification may be made against a payment database generated by the payer system when the checks are created in order to assure that the checks were actually sent by the payer system. Additional information regarding disbursement 1013 and batch processing 1014 is contained in United States patent application entitled System and Method for Electronic Authorization of Batch Checks, U.S. patent application Ser. No. 10/155,800, invented by Duc Lam, Matthew Roland and Xuan (Sunny) McRae, which is incorporated herein by reference in its entirety.

Settlement logic 1017 allows for settlement of payment between a payer system 1001 and payee system 1002. Settlement mechanism includes exiting combination of paper based checks, standard domestic electronic payment network (Fed Wire, ACH, CHIPS, etc), international electronic payment networks (SWIFT, Bolera, etc.), propriety private payment networks (VISA, MasterCard, and American Express, etc.), and internal account bank transfer (On-us, etc.) For example, settlement may be made through debits and credits in a database within the system. Alternatively, settlement may be performed through an external network such as the ACH network with financial institutions involved, such as financial institutions 1050.

Settlement logic 1017 supports standard fund transfer model (buyer's account will be debited and supplier's account will be credited.) and good funds model (buyer's account will be debited and a temporary account will be credited. Upon receiving fund availability in temporary account, the supplier will be credited). Settlement logic 1017 is implemented via issuing requests to the settlement network. Such request can be tile-based requests such as ACH or transactional request such as VISA networks. For each request, there will be associated confirmation ID to ensure the trace ability of each transaction.

Global database 1028 is available for use by elements that send payment, such as disbursement logic 1013 and settlement logic 1017. Global database 1028 is also available for elements that send other documents or information between payees and their respective financial institutions. For example, invoices may be sent based on the respective recipient address as stored in the global database 1028. Thus, invoice sends logic 1021 is in communication with global database 1028.

Global database 1028 includes addresses and account information for respective payers and payees who use the system. Links are created between items in the global database and other databases in order to allow for the global database to be updated and the corresponding linked information to continue to be used. Thus, for example, according to one embodiment of the invention, a payer has a separate database, payer databases 1027, and matches are created between items, such as addresses or payment entities and payer 1027 and respective items in global database 1028 through a match generation process 1030. Such matched generation process 1030 may include providing a user of the payer system 1001 with a series of candidate matches between addresses stored on payer database 1027 and corresponding spellings of addresses or payment entities in global database 1028. The user of payer system 1001 is then able to select the best match and create a link between the respective address or payment identification.

This link can then later be used to effect payment to the proper address as stored in the global database. Similarly, a match generation between items in payee database 1029 and global database 1028 can be performed so that payee system 1002 can send items to the proper recipient using information in global database 1028. Enrollment logic 1035 is available to enroll new entities as payees into the global database to make them available for use by payer system 1001 or payee system 1002.

The links established are then available to allow for use of information in the respective payer database 1027 and payee database 1029 in order to find recipients to whom documents or payments are to be sent. In addition to address information 1038 and account information 1039, according to one embodiment. of the invention, public keys of various participants in the systems are stored in the global database 1028. Such keys are then available for use in order to determine the accuracy of a digital signature sent h a particular entity. Additional information regarding global database 1028 and related logic and communication is contained in the United States patent application entitled Method and System for Collaborative Vendor Reconciliation, U.S. patent application Ser. No. 10/155,797, invented by Duc Lam, Georg Muller, Chandra (CP) Agrawal, Baby Lingampalli, Pavel Lopin and Xuan (Sunny) McRae, which is incorporated herein by reference in its entirety.

In the FIG. 10 system, invoices and other documents are exchanged between payers and payees over the public and internet networks 1080. To help provide security and privacy, before they are sent, invoices and or documents are signed with source private key, and encrypted with destination public key shown as 1081. Upon receiving invoice or other document, the document is decrypted with its own private key, and validated against source public key to ensure non-repudiation shown as 1082.

The system also can integrate with multiple enterprise resource planning (ERP) systems shown as 1062. Such ERP systems include: PeopleSoft, SAP, Oracle Financials, etc. The system will integrate with these ERP systems via native and/or standard interfaces. An example of native interface for PeopleSoft is Message Agent, etc. The interfaces include EDI gateway, etc. The system utilizes the ERP to extract documents (purchase orders, invoice status, unit of measurements, vendor list, etc.), to post documents (invoices, vendor information, status, etc.).

The foregoing description of various embodiments of the invention has been presented for purposes of illustration and description. It is not intended to limit the invention to the precise forms described.

What is claimed is:

1. A system for providing supply chain financing, comprising:
   an invoice system associated with a financial institution for processing at least one invoice to initiate a financing process, the invoice system comprising:
   a communications network;
   one or more computers, each comprising at least a computer processor, communicatively coupled through the communications network and configured to:
      receive information relating to the at least one invoice comprising information relating to a validation of the at least one invoice;
      automatically prepare a discount proposal option to present to a seller, the discount proposal option being prepared by the financial institution and comprising a discount payment amount in exchange for earlier or immediate payment;
      present, electronically, the discount proposal option to the seller;
      negotiate the terms of the discount proposal option with the seller;
      make modifications to the terms of the discount proposal option;
      receive a counter-discount proposal from the seller; and
      adjust the terms of the discount proposal option upon receiving the counter-discount proposal.

2. The system of claim 1 wherein the discount proposal option comprises different schemes for arranging early or immediate payment.

3. The system of claim 1 further comprising the one or more computers configured to arrange payments to the seller and/or from a buyer.

4. The system of claim 3 wherein the seller is paid at a discount on the agreed date if the seller accepts the discount proposal option, and on the date of maturity if the seller rejects the discount proposal option.

5. The system of claim 3 wherein payments are received or taken from a buyer's account on the date of maturity, or on agreed-upon date.

6. The system of claim 1 further comprising the one or more computers further configured to enable negotiation between the buyer and the financial institution.

7. The system of claim 1, wherein the information relating to the validation is received from a buyer.

8. A method for providing supply chain financing, comprising:
   receiving, by at least one computer processor, information relating to at least one invoice comprising information relating to a validation of the at least one invoice;
   automatically preparing, by the at least one computer processor, a discount proposal option to present to a seller, the discount proposal option being prepared by the financial institution and comprising a discount payment amount in exchange for earlier or immediate payment;
   presenting, electronically, the discount proposal option to the seller;
   negotiating the terms of the discount proposal option with the seller,
   making modifications to the terms of the discount proposal option,
   receiving a counter-discount proposal from the seller, and
   adjusting the terms of the discount proposal option upon receiving the counter-discount proposal.

9. The method of claim 8 wherein the discount proposal option comprises different schemes for arranging early or immediate payment.

10. The method of claim 8 further comprising:
    arranging payments to the seller and/or from the buyer.

11. The method of claim 10 wherein the seller is paid at a discount on the agreed date if the seller accepts the discount proposal option, and on the date of maturity if the seller rejects the discount proposal option.

12. The method of claim 10 wherein payments are received or taken from a buyer's account on the date of maturity, or on agreed-upon date.

13. The method of claim 8 further comprising:
    negotiating the terms of a second discount proposal option with a buyer.

14. The method of claim 8, wherein the information relating to the validation is received from a buyer.

* * * * *